United States Patent
Ohtsuru

(10) Patent No.: US 7,379,110 B2
(45) Date of Patent: May 27, 2008

(54) SOLID-STATE IMAGE PICKUP DEVICE FOR PRODUCING THINNED IMAGE

(75) Inventor: Yuzo Ohtsuru, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 743 days.

(21) Appl. No.: 10/988,909

(22) Filed: Nov. 15, 2004

(65) Prior Publication Data

US 2005/0088559 A1    Apr. 28, 2005

Related U.S. Application Data

(62) Division of application No. 09/135,180, filed on Aug. 17, 1998, now Pat. No. 6,847,401.

(30) Foreign Application Priority Data

| Aug. 25, 1997 | (JP) | ................................. 9-228335 |
| Aug. 25, 1997 | (JP) | ................................. 9-228336 |
| Aug. 25, 1997 | (JP) | ................................. 9-228337 |

(51) Int. Cl.
*H04N 3/14* (2006.01)

(52) U.S. Cl. ..................... 348/311; 348/314; 348/272; 348/319

(58) Field of Classification Search ................. 348/311, 348/312, 317, 314, 315, 272, 277, 296, 297, 348/299
See application file for complete search history.

(56) References Cited

U.S. PATENT DOCUMENTS

| 4,954,900 | A | | 9/1990 | Frame | ........................ 348/317 |
| 5,121,192 | A | | 6/1992 | Kazui | .......................... 348/277 |
| 5,144,445 | A | * | 9/1992 | Higashitsutsumi | .......... 348/294 |
| 5,402,173 | A | * | 3/1995 | Noguchi et al. | ............. 348/322 |
| 5,517,244 | A | | 5/1996 | Stekelenburg | .............. 348/317 |
| 5,668,597 | A | | 9/1997 | Parulski et al. | ............. 348/315 |
| 5,703,641 | A | | 12/1997 | Watanabe | .................... 348/272 |
| 5,838,372 | A | * | 11/1998 | Wood | .......................... 348/312 |
| 5,990,953 | A | * | 11/1999 | Nakashiba | ................... 348/314 |
| RE36,812 | E | | 8/2000 | Tani | ........................... 348/298 |
| 6,118,481 | A | | 9/2000 | Hamada | ...................... 348/317 |
| 6,191,817 | B1 | * | 2/2001 | Kanbe | ......................... 348/314 |
| 6,288,744 | B1 | | 9/2001 | Takahashi et al. | .......... 348/317 |
| 6,351,284 | B1 | * | 2/2002 | Watanabe et al. | ........... 348/312 |

* cited by examiner

*Primary Examiner*—David Ometz
*Assistant Examiner*—Luong T. Nguyen
(74) *Attorney, Agent, or Firm*—Hogan & Hartson LLP

(57) ABSTRACT

There is disclosed a solid-state image pickup device in which light receiving elements of a light receiving region generates information charges in accordance with incident lights. The information charges are transferred to storage picture elements of a storage region, and subsequently emitted as image signals. Here, the storage region is formed smaller than the light receiving region. Only the information charges of a selected region are transferred from the light receiving elements of the light receiving region to the storage region. Therefore, thinned-out image signals can be obtained.

11 Claims, 17 Drawing Sheets

FIRST OPERATION

SECOND OPERATION

SOLID-STATE IMAGE PICKUP DEVICE FOR PRODUCING THINNED IMAGE

This is a divisional of application Ser. No. 09/135,180 filed Aug. 17, 1998 now U.S. Pat. No. 6,847,401, which application is hereby incorporated by reference in its entirety.

BACKGROUND OF THE INVENTION

1. Field of the Invention

The present invention relates to a frame transfer system CCD solid-state image pickup device and an operation method of the solid-state image pickup device.

2. Description of the Related Art

Electronic still cameras using solid-state image pickup devices have been utilized as means for introducing image information into a computer device such as a personal computer or a word processor. These electronic still cameras are constituted so that an object image can be picked up as an animated image, i.e., the continuum of static images and the image information of one desired image frame can be fetched from these images in the same manner as in a conventional image pickup device such as a television camera. Usually, in the processing of the image information of such an electronic still camera, in order to speed up the processing, the continuous images are reproduced with image signals of information reduced by appropriately thinning out the image information, and complete signal processing is conducted only for the image information of one image frame to be finally fetched.

FIG. 1 is a block diagram showing a constitution of a conventional electronic still camera.

A CCD solid-state image pickup device 1 includes a plurality of light receiving elements arranged in matrix and shift registers associated with the light receiving elements. A plurality of light receiving elements generate information charges in response to light of the object image which is radiated to a light receiving surface by a known lens mechanism, and these elements independently accumulate the information charges. The shift register transfers and outputs the information charges accumulated in each light receiving element in a predetermined sequence. Additionally, in the solid-state image pickup device 1, the output end of the shift register is provided with a capacity for accumulating the information charge in a unit of picture element. The amount of the transferred and emitted information charges is converted to a voltage value, which is fetched and emitted as an image signal Y0($t$).

A drive circuit 2 supplies multiphase vertical transfer clock $\phi v$ and horizontal transfer clock $\phi h$ to the shift registers of the solid-state image pickup device 1 to transfer and output the information charges accumulated in a plurality of light receiving elements in the predetermined sequence. Specifically, the information charges of each light receiving element is transferred to the shift register according to a vertical scanning timing and subsequently transferred/output line by line according to a horizontal scanning timing, so that the continuous image signal Y0($t$) in a line unit can be obtained. A timing control circuit 3 generates a horizontal synchronous signal HT and a vertical synchronous signal VT based on a reference clock of a constant cycle, and supplies the signals to the drive circuit 2. The horizontal and vertical synchronous signals HT and VT determine the horizontal and vertical scanning timings of the solid-state image pickup device 1, and are generated according to a predetermined format. Simultaneously, a timing signal PC for standardizing the image signal Y0($t$) according to the horizontal and vertical synchronous signals HT and VT is generated and supplied to a signal processing circuit 4 to be described later. Additionally, the timing control circuit 3 responds to an image defining instruction DI to stop the drive circuit 2 from its continuous image pickup operation and to allow the signal processing circuit 4 to output image data D(n) of one specific image frame corresponding to the image signal Y0($t$).

The signal processing circuit 4 takes the image signal Y0($t$) output from the solid-state image pickup device 1, applies various processings such as sample holding, level correction and the like in accordance with the timing signal PC, and supplies an image signal Y1($t$) according to the predetermined format to a display 5. The signal processing circuit 4 includes an A/D converter and a D/A converter, in which the image signal Y0($t$) is subjected to a signal processing as digital data, reset to the analog-value image signal Y1($t$) after the predetermined signal processing is completed, and supplied to the display 5. Furthermore, the digital image data D(n) for one image frame of the image signal Y0($t$) when the timing control circuit 3 receives the image defining instruction DI is supplied to the outside as a static image output by the signal processing circuit 4. The display 5 is constituted of, for example, an LCD panel for continuously displaying the image picked up by the solid-state image pickup device 1 in accordance with the image signal Y1($t$) supplied from the signal processing circuit 4. Additionally, after the image defining instruction DI is received, a static image of the image data D(n) emitted as the static image output is displayed.

FIG. 2 is a schematic diagram showing the constitution of the CCD solid-state image pickup device 1 in a frame transfer system. In FIG. 2, for the sake of simplicity, the, arrangement of light receiving elements is shown as a pattern of 12 lines by 16 columns. FIG. 3 is a timing chart showing the relationship of each transfer clock and each synchronous signal for operating the solid-state image pickup device 1.

The frame transfer system CCD solid-state image pickup device 1 comprises an image pickup section 1$i$, a storage section 1$s$, a horizontal transfer section 1$h$ and an output section 1$d$. The image pickup section 1$i$ comprises a plurality of vertically continuous and mutually parallel CCD shift registers, and each bit of the shift registers constitutes each light receiving element. Frame transfer clocks $\phi f1$ to $\phi f3$ synchronous with the vertical synchronous-signal VT are applied to the image pickup section 1$i$, and the information charges accumulated in each light receiving element during the image pickup period are transferred to the storage section 1$s$ at a high rate in a vertical-scanning blanking period.

The storage section 1$s$ continues from the shift registers of the image pickup section 1$i$, and comprises a plurality of CCD shift registers coincident in bit number. Each bit of the shift registers constitutes a storage picture element, in which the information charges transferred/emitted from each light receiving element of the image pickup section 1$i$ are temporarily accumulated. Vertical transfer clocks $\phi v1$ to $\phi v3$ synchronous with the vertical and horizontal synchronous signals VT and HT are applied to the storage section 1$s$, so that the information charges for one image frame are taken from the image pickup section 1$i$. Additionally, the taken information charges are transferred by a unit of one line to the horizontal transfer section 1$h$ in a horizontal-scanning blanking period.

The horizontal transfer section 1h is constituted of a single CCD shift register having each bit coupled to the output of each shift register of the storage section 1s, and each bit receives the information charges transferred/emitted from each shift register of the storage section 1s. Horizontal transfer clocks $\phi h1$ and $\phi h2$ synchronous with the horizontal synchronous signal HT are applied to the horizontal transfer section 1h, so that the information charges transferred/emitted from each shift register of the storage section is are successively transferred by a unit of horizontal line to the output section 1d.

The output section 1d is able to receive information charges on the output side of the horizontal transfer section 1h, and subsequently outputs a voltage value corresponding to the amount of electric charge upon receipt of the information charges transferred/emitted from the horizontal transfer section 1h. A reset clock $\phi r$ is applied to the output section 1d in accordance with the horizontal transfer clocks $\phi h1$ and $\phi h2$. By discharging the information charges successively transferred/emitted from the horizontal transfer section 1h by a unit of picture element, the voltage value corresponding to the amount of the information charges for each picture element is fetched. Here, a change of the emitted voltage value forms the image signal Y0(t).

In the frame transfer system solid-state image pickup device 1, since the storage section 1s for temporarily accumulating the information charge which is obtained by picking up the image is apart from the light receiving elements of the image pickup section 1i, there is only slight leakage of unnecessary electric charges from the light receiving elements. Therefore, the solid-state image pickup device 1 is suitable for an electronic still camera which reads information charges from the solid-state image pickup device at arbitrary timings to obtain static images.

In the electronic still camera described above, an animated image is fetched by continuously operating the solid-state image pickup device 1, and a desired static image can be fetched while observing the animated image. At that time, since the animated image forms only a confirming image frame, it need not be of high quality. Usually, by decreasing the information amount of the image signal Y0(t) beforehand, the signal processing in the signal processing circuit 4 is simplified. Specifically, by thinning out the image signal Y0(t) by a constant unit of column or line in the input stage of the signal processing circuit 4 to decrease the information amount, various signal processings can be simplified and speeded up.

However, the constitution for thinning out the image signal Y0(t) in the signal processing circuit 4 speeds up the circuit operation of the input section to increase the power consumption, and also results in an increase of cost because the circuit itself easily becomes large-scaled.

SUMMARY OF THE INVENTION

An object of the present invention is to provide an inexpensive electronic still camera with a high resolution in which an increase of power consumption is suppressed to reduce costs.

In one aspect of the present invention, in a first image pickup operation, an information charge generated in a first light receiving element (pixel: picture element) is stored in the picture element as is, and an information charge generated in a second light receiving element is discharged toward a substrate. Subsequently, in a second image pickup operation, the information charges generated in the first and second light receiving elements are stored unaltered in the picture elements. Therefore, a solid-state image pickup device can be obtained in which it can be selected in operation whether to output an image signal by reducing the number of picture elements or by reading the information charges from all the light receiving elements.

Moreover, in the first image pickup operation, the information charges are accumulated in only the first light receiving element, and a first image signal continuously indicating an image frame with a low resolution can be obtained. Subsequently, in the second image pickup operation, the information charges are accumulated in the first and second light receiving elements, and a second image signal indicative of an image frame with a high resolution can be obtained.

Furthermore, according to another aspect of the present invention, the predetermined information charges are stored in the first and second light receiving elements in a first period, and in a subsequent second period, only the information charges accumulated in the second light receiving element are discharged from a channel region toward a substrate region with the information charges stored in the first light receiving element held therein. Therefore, the information charges are thinned out in accordance with the arrangement interval of the first light receiving element, so that an image signal with a reduced information amount can be obtained.

Additionally, information charges which are not taken into storage elements are discharged from the channel region to a semiconductor substrate side in a boundary portion between a light receiving region and a storage region in accordance with a difference between first and second transfer clock cycles. In this case, since a transfer electrode with a long channel length formed therein is disposed in the boundary portion between the light receiving region and the storage region, a portion of the light receiving region to which the information charges are discharged becomes apart from a portion of the storage region in which the information charges are stored. Therefore, the information charges discharged from the light receiving region are hardly mixed into the information charges stored in the storage region.

Moreover, the information charges of a part of the light receiving elements in the light receiving region are selected in accordance with a ratio of the first and second transfer clock cycles and transferred to the storage picture elements in the storage region. In the process of transfer, since the information charges of a part of the light receiving elements are discharged, the number of picture elements is reduced.

DETAILED DESCRIPTION OF THE PREFERRED EMBODIMENTS

First Embodiment

Figure 4:
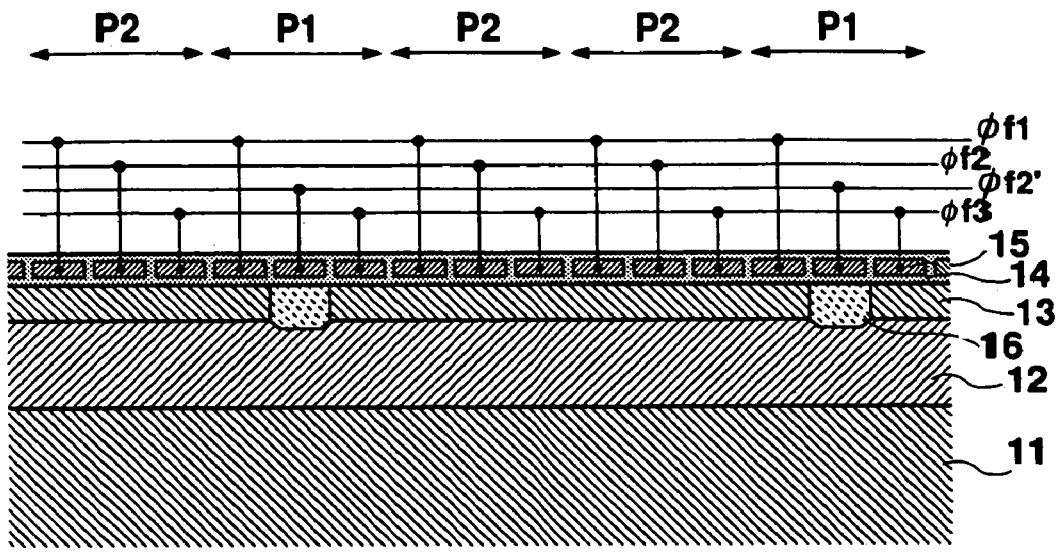
FIG. 4 is a sectional-view showing a structure of an image pickup section of a solid-state image pickup device according to a first embodiment.
Figure 5:
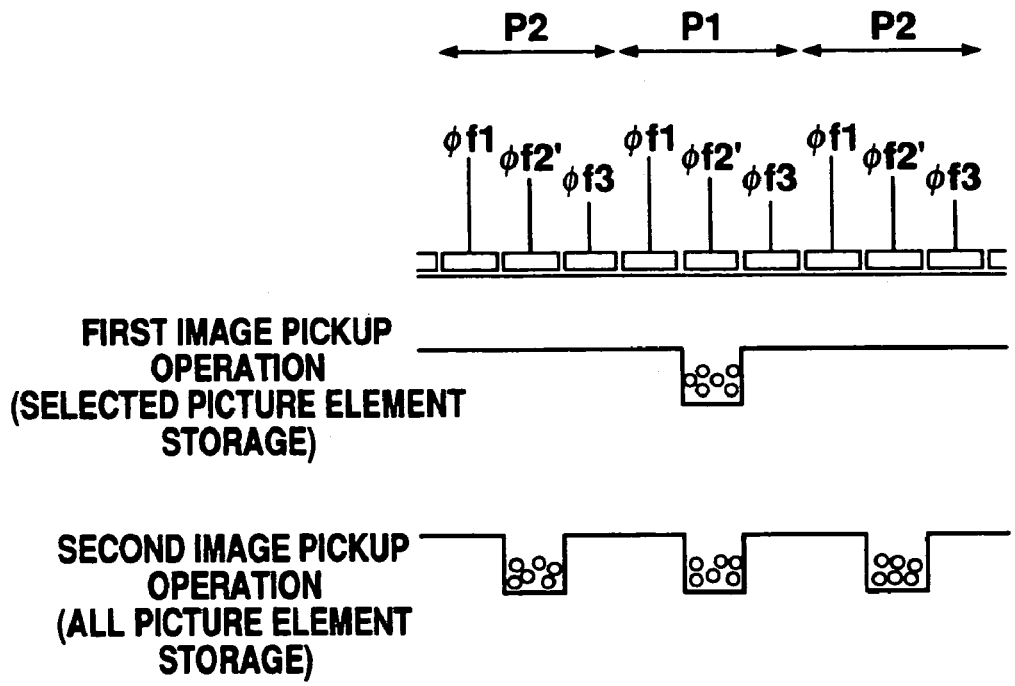
FIG. 5 is a diagram showing potentials inside the image pickup section of the solid-state image pickup device of the first embodiment.

FIG. 4 is a sectional view showing a structure of a solid-state image pickup device according to the present invention, and FIG. 5 is a diagram showing potentials-inside the solid-state image pickup device. Additionally, the solid-state image pickup device of the present invention is of a frame transfer system, and FIG. 4 shows its image pickup section.

A P-type diffusion region 12 is formed on one principal face of an N-type semiconductor substrate 11, and a plurality of channel regions extending in one direction (horizontal direction of FIG. 4) are formed parallel with one another in the diffusion region 12. Each channel region forms a transfer route of information charges, and has an N-type embedded layer 13 in the vicinity of its surface, which forms an embedded channel structure. Furthermore, the semiconductor substrate 11 serves as an overflow drain for absorbing the information charges leaking from the channel regions, to which predetermined fixed potentials-are applied in accumulating, transfer and discharge periods of the information charges, respectively. A plurality of transfer electrodes 15 extend in a direction intersecting the channel regions and arranged parallel with one another via an insulating film 14 on the channel regions with the embedded layer 13 formed thereon. The transfer electrodes 15 may be formed in a double-layer structure in which clearances in the first-layer transfer electrodes 15 are covered with second-layer transfer electrodes. In a three-phase operation, first and second light receiving elements P1 and P2 each formed of three transfer electrodes 15 are set in the channel regions. In a channel region 16 in which the first light receiving element P1 is set, an N-type doped region 16 having a higher impurity concentration than the embedded layer 13 is formed opposite to the central transfer electrode 15. The injection region 16 is formed to prevent the information charge from escaping from the embedded layer 13 toward the semiconductor substrate 11, but may be unnecessary if the information charge can be securely held by only the transfer electrode 15.

The first light receiving element P1 accumulates the information charges in both first and second image pickup operations, while the second light receiving element P2 accumulates the information charges only in the second image pickup operation. In the embodiment, by disposing two second light receiving elements P2 between the first light receiving elements P1 to reduce the number of vertical picture elements to one-third, a first image signal Y0($t$) is obtained. Three transfer electrodes 15 are allocated to one picture element.

Three phase transfer clocks $\phi f1$, $\phi f2$ and $\phi f3$ or $\phi f1$, $\phi f2'$ and $\phi f3$ are applied to the transfer electrodes 15 to control potentials in the channel regions. The transfer clocks $\phi f1$ and $\phi f3$ inactivate the transfer electrodes 15 positioned on both ends of each light receiving element P1 or P2 and form potential barriers for electrically separating adjoining light receiving elements in the first and second image pickup operations. The transfer clock $\phi f2$ turns on the transfer electrode 15 positioned in the center of the first light receiving element P1 and forms a potential well for accumulating the information charges in the first and second image pickup operations. The transfer clock $\phi f2'$ turns off the transfer electrode 15 positioned in the center of the first light receiving element P1 and fails to form the potential well in the first image pickup operation, but turns on the same transfer electrode 15 and forms the potential well in the second image pickup operation. Therefore, the second light receiving element P2 accumulates the information charges only in the second transfer operation. Such a state is shown in FIG. 5.

Figure 6:
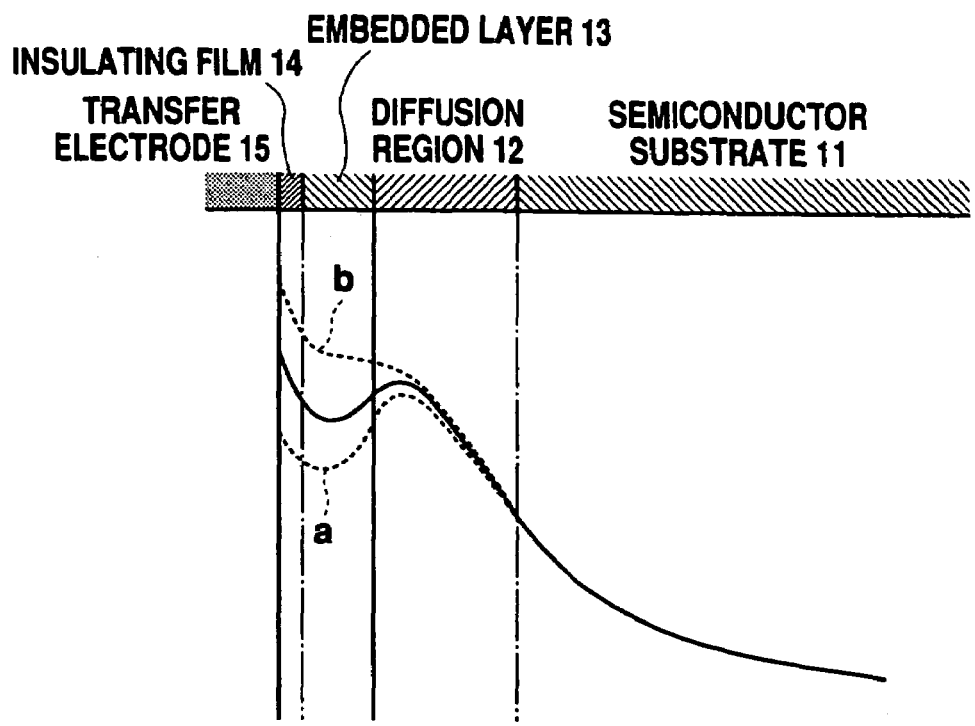
FIG. 6 is a profile view showing the potential state of the solid-state image pickup device of the first embodiment.

In a CCD solid-state image pickup device of a vertical overflow drain structure, a potential profile shown by a solid line in FIG. 6 is formed in a depth direction of the semiconductor substrate 11. The potential becomes deeper as further away from the transfer electrodes 15, at one point indicates a minimum value in the embedded layer 13 and a maximum value in the diffusion layer 12, and becomes deeper as it advances from the diffusion layer 12 to the depth of the semiconductor substrate 11. Such a potential can be controlled by the potentials applied to the semiconductor substrate 11 and the transfer electrodes 15. If the potential is raised, the potential is formed deep. Conversely, if the potential is lowered, the potential is formed shallow.

Figure 3:
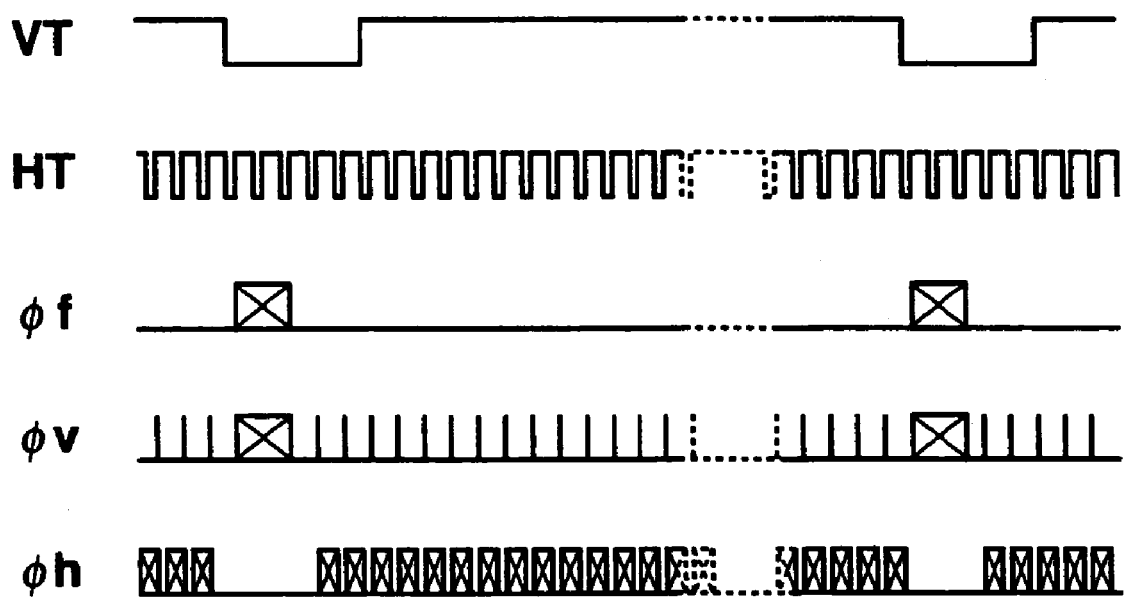
FIG. 3 is a timing chart showing the operation of the frame transfer system solid-state image pickup device.

When the information charges are accumulated in the channel regions, the transfer electrodes 15 are activated. Specifically, by raising the electric potential applied to the transfer electrode 15, a potential profile shown by a curve a is formed. Therefore, the information charges can be accumulated only to make up a difference between the minimum value of the embedded layer 13 and the maximum value of the diffusion layer 12. On the other hand, when the information charges are discharged toward the semiconductor substrate 11 instead of being accumulated in the channel regions, the transfer electrodes 15 are inactivated. Specifically, by lowering the electric potentials applied to the transfer electrodes 15, a potential profile as shown by a curve b is formed. Therefore, the information charges generated in the channel regions are discharged toward the semiconductor substrate 11 along a potential gradient. In the first image pickup operation, the transfer clock φf2 forms the potential shown by the curve a of FIG. 3, while the transfer clocks φf1, φf2' and φf3 form potentials shown by the curve b of FIG. 3. Additionally, in the second image pickup operation, the transfer clocks φf2 and φf2' form the potentials shown by the curve a of FIG. 3, while the transfer clocks φf1 and φf3 form potentials shown by the curve b of FIG. 3. The potential on the side of the semiconductor substrate 11 hardly changes because the electric potential applied to the semiconductor substrate 11 is not altered between the first and second image pickup operations.

Figure 7:
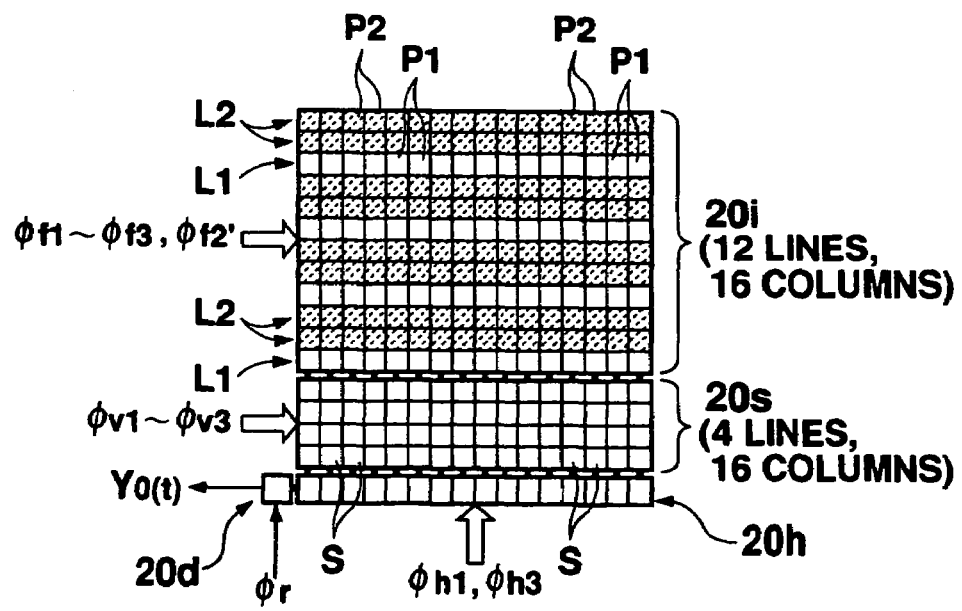
FIG. 7 is a plan view diagrammatically showing the solid-state image pickup device of the first embodiment.

FIG. 7 is a schematic diagram showing the structure of the frame transfer system CCD solid-state image pickup device according to the present invention. In FIG. 7, for the sake of simplicity, the arrangement of the first and second light receiving elements P1 and P2 is shown in 12 lines by 16 columns.

Figure 1:
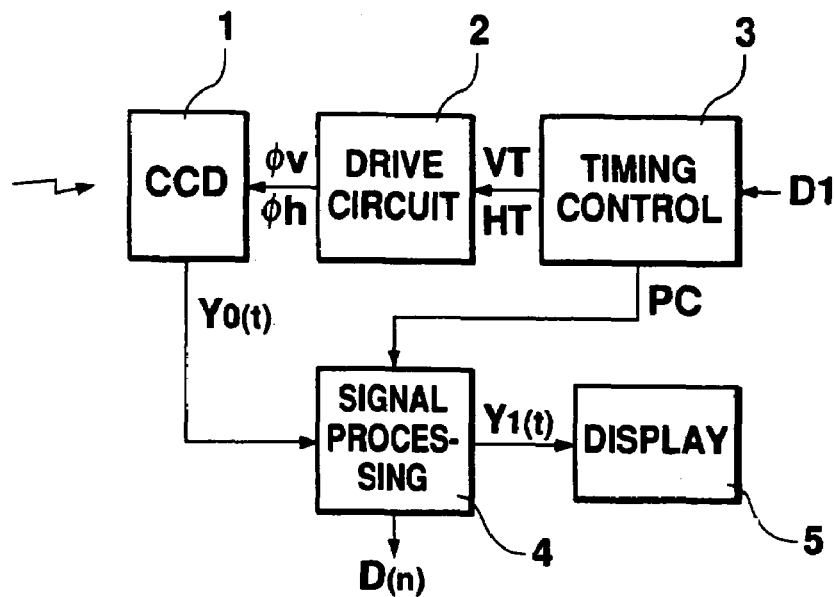
FIG. 1 is a block diagram showing a structure of a conventional image pickup device.
Figure 2:
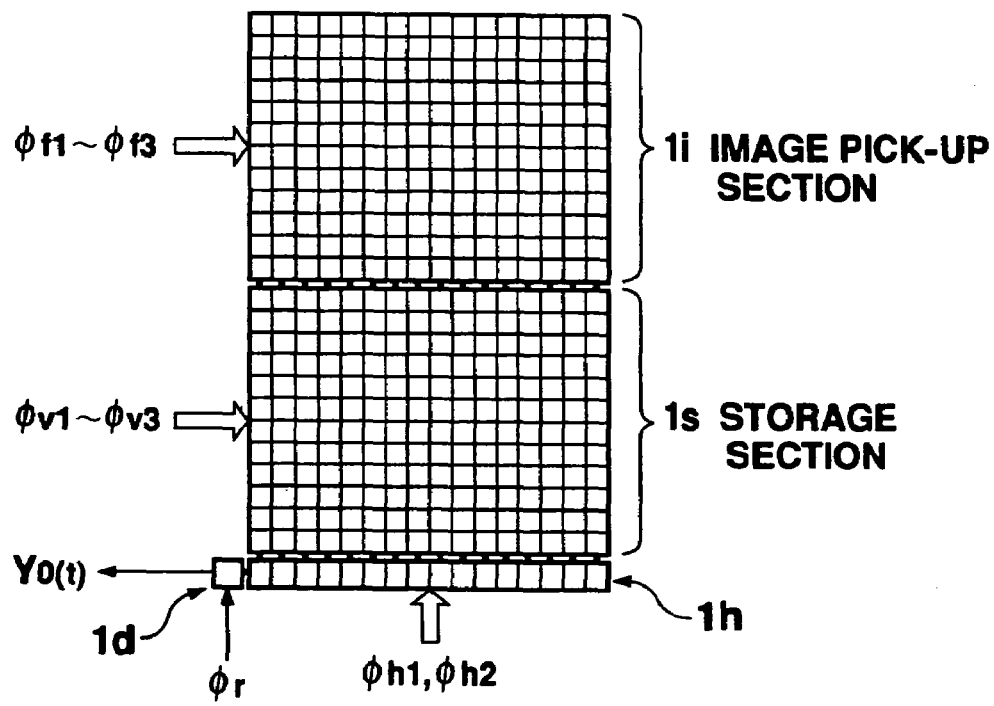
FIG. 2 is a plan view diagrammatically showing a conventional frame transfer system solid-state image pickup device.

A frame transfer system CCD solid-state image pickup device 20 is constituted of an image pickup section 20i, a storage section 20s, a horizontal transfer section 20h and an output section 20d. The image pickup section 20i is constituted of a plurality of vertically continuous, mutually parallel CCD shift registers, and each bit of the shift registers constitutes the first or second light receiving element P1 or P2. The first light receiving element P1 for accumulating the information charges in the first and second image pickup operations and the second light receiving element P2 for accumulating the information charges only in the second image pickup operation are continuous in lines, and form first and second lines L1 and L2, respectively. First lines L1 are disposed at a constant interval, while the appropriate number of second lines L2 are disposed between these first lines. In this embodiment, two second lines L2 are disposed between each first lines L1. The transfer clocks φf1, φf2 and φf3 are applied to the first lines, while the transfer clocks φf1, φf2' and φf3 are applied to the second lines L2. When the information charges accumulated in the light receiving elements P1 and P2 are transferred, by making the transfer clock φf2 coincident with the transfer clock φf2', the information charges are transferred to the storage section 20s (frame transfer). In the first image pickup operation, the information charges are transferred at a high rate in a timing synchronous with the vertical synchronous signal VT in the same manner as the image pickup section 1i of the solid-state image pickup device 1 shown in FIG. 2. On the other hand, in the second image pickup operation, high-rate-transfer is not-performed, with the transfer instead being performed line by line in a cycle in accordance with the horizontal scanning in the same manner as the storage section 1s of the solid-state image pickup device 1 shown in FIG. 2.

The storage section 20s comprises a plurality of CCD shift registers continued from the shift registers of the image pickup section 20i, and each bit of the shift registers constitutes a storage picture element S. The storage section 20s is optically shielded and temporarily accumulates the information charges transferred/emitted from the first light receiving elements P1 of the image pickup section 20i. The number of vertically arranged storage picture elements S of the storage section 20s is equal to the number of the first lines L1 of the image pickup section 20i, i.e., the number of the first light receiving elements P1 of the image pickup section 20i. In this embodiment, the storage section 20s is formed in lines one-third of the lines of the image pickup section 20i (4 lines by 16 columns). The vertical transfer clocks φv1 to φv3 synchronous with the vertical or horizontal synchronous signal VT or HT are applied to the lines of the storage section 20s. In the first image pickup operation, the information charges are taken in from the first light receiving elements P1 of the image pickup section 20i at frequencies which are one third of the frequencies of the transfer clocks φf1 to φf3 and φf2', and the taken information charges are transferred to the horizontal transfer section 20h line by line in each horizontal scanning time. In the second image pickup operation, by making the vertical transfer clocks φv1 to φv3 coincide with the transfer clocks φf1 to φf3 and φf2', the storage section 20s is operated as an extended section of each shift register of the image pickup section 20i, and the information charges from the first and second light receiving elements P1 and P2 are successively transferred to the horizontal transfer section 20h.

The horizontal transfer section 20h comprises a single CCD shift register having each bit coupled to the output of each shift register of the storage section 20s, and each bit receives the information charge transferred/emitted from each shift register of the storage section 20s. The output section 20d includes a capacity for receiving the information charges on the output side of the horizontal transfer section 20h, and emits a voltage value corresponding to the amount of the electric charges upon receipt of the information charges transferred/emitted from the horizontal transfer section 20h. The horizontal transfer section 20h and the output section 20d correspond to the horizontal transfer section 1h and the output section 1d of the solid-state image pickup device 1 shown in FIG. 2. Specifically, the information charges in the horizontal transfer section 20h are transferred to the output section 20d in response to horizontal transfer clocks φh1 and φh2 synchronous with the horizontal synchronous signal HT, and the information charges accumulated in the capacity of the output section 20d are successively discharged in response to a reset clock φr. Subsequently, a change in electric potential of the capacity of the output section 20d is emitted as an image signal Y0(t).

Figure 8:
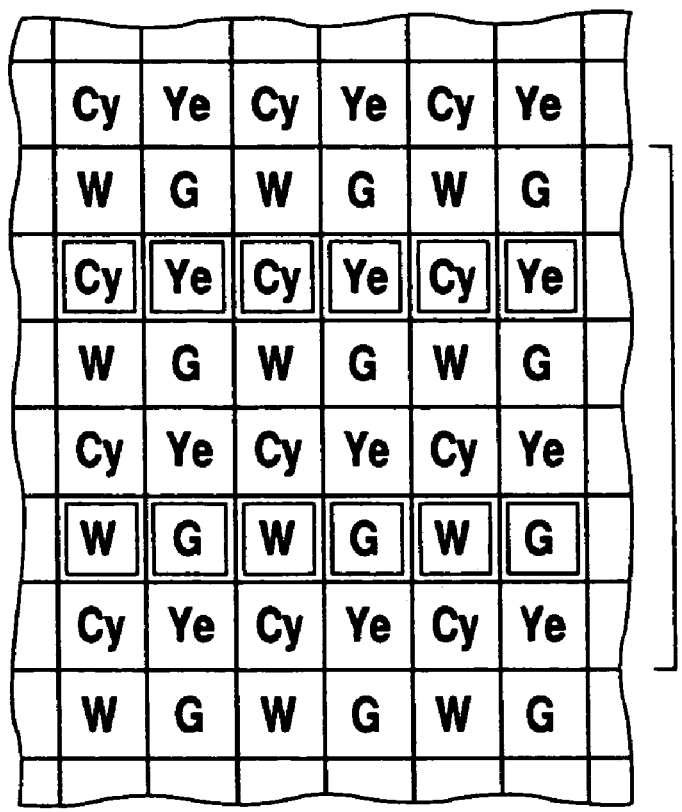
FIG. 8 is a plan view showing an example structure of a mosaic color filter.

When the solid-state image pickup device 20 is used for picking up color images, a color filter is attached to the light receiving section 20i to associate the first and second light receiving elements P1 and P2 with specific color components. For example, as shown in FIG. 8, cyan (Cy) and yellow (Ye) are alternately arranged in odd lines, while white (W) and green (G) are alternately arranged in even lines. When such a color filter is attached to the image pickup section 20i, six picture elements in the vertical direction are used as one unit, and different color components are fetched from two of the picture elements. In FIG. 8, the picture elements to be fetched are surrounded with squares. Therefore, even in the first image pickup operation for performing an image pickup of a low resolution, all color components can be fetched independently in the same manner as in the second image pickup operation for reading the information charges from all light receiving elements.

Figure 9:
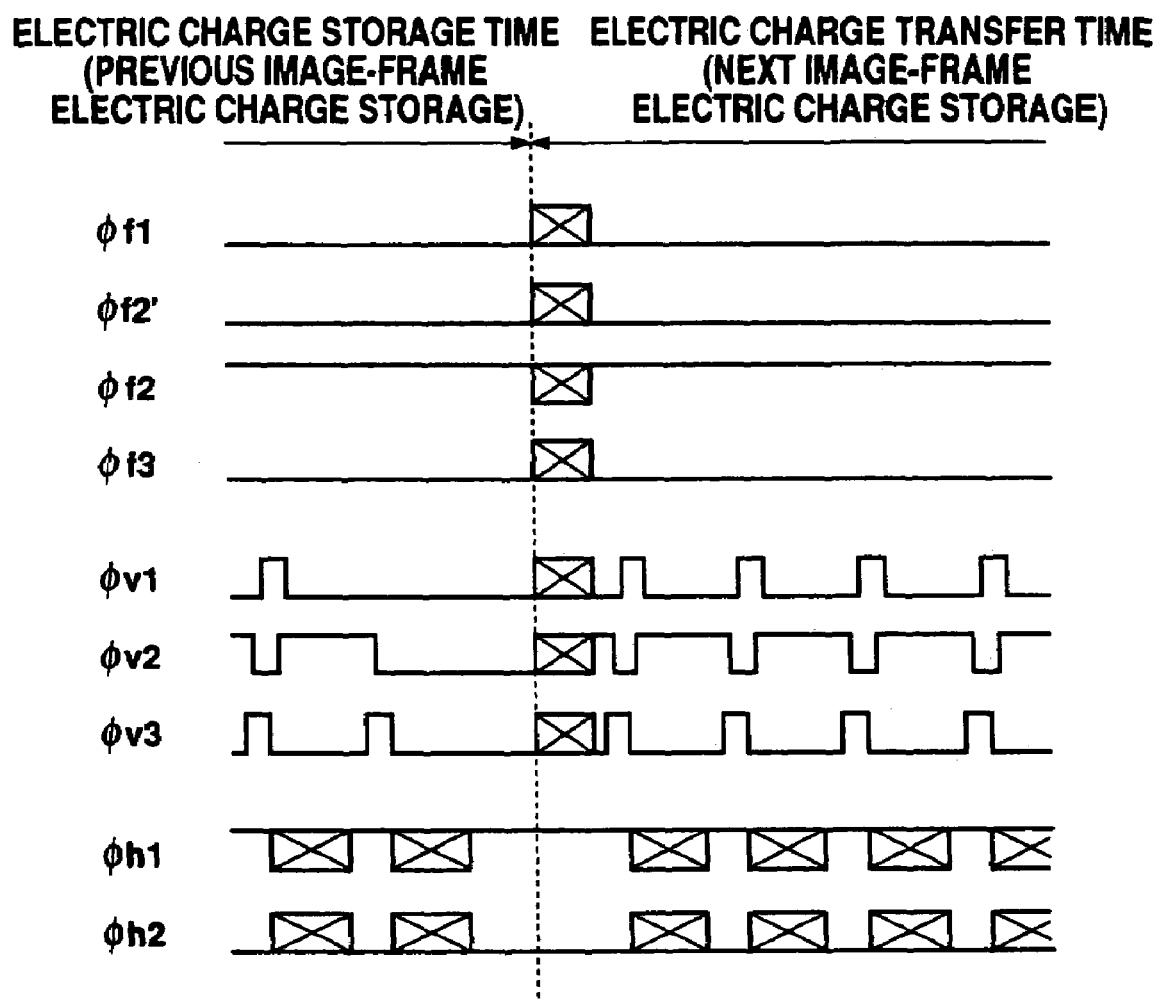
FIG. 9 is a diagram showing the waveform of each transfer clock in a first image pickup operation.
Figure 10:
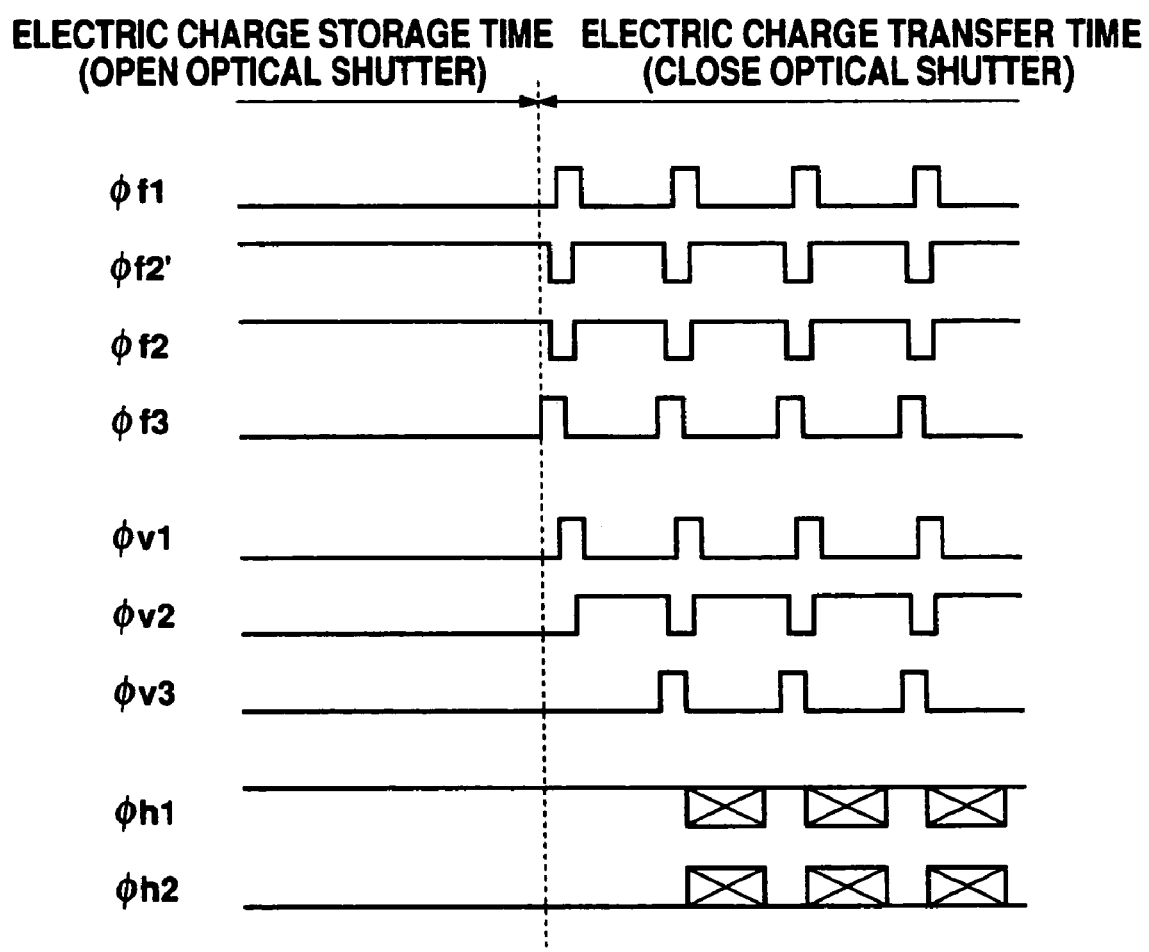
FIG. 10 is a diagram showing the waveform of each transfer clock in a second image pickup operation.

FIGS. 9 and 10 are diagrams of waveforms of transfer clocks for realizing the operation method of the solid-state image pickup device of the present invention, and respectively show the first and second image-pickup operations.

In this embodiment, each transfer clock has three phases. In such a three-phase operation, three transfer electrodes 15 for one picture element are arranged in each light receiving element P1 or P2 of the image pickup section 20*i* as shown in FIG. 4. As shown in FIG. 6, each transfer electrode 15 forms the potential profile deep to accumulate the information charges when the applied electric potentials are high, and forms the potential profile shallow to discharge the information charges when the applied electric potentials are low.

As shown in FIG. 9, in the first image pickup operation, the transfer clocks φf1, φf2' and φf3 are fixed at low levels in an electric charge storage time, and have high-frequency reading pulses at the start of an electric charge transfer time subsequent to the electric charge storage time. Moreover, the transfer clock φf2 is fixed at a high level in the electric charge storage time, and has a reading pulse of a phase equal to the phase of the transfer clock φf2' at the start of the electric charge transfer time. Therefore, in the image pickup section 20*i*, the information charges are accumulated only in the first light receiving element P1 for receiving the transfer clock φf2 during the electric charge storage time, and the information charges accumulated in the light receiving element P1 are transferred toward the storage section 20*s* at a high rate at the start of the electric charge transfer time. At this point, since the information charges are accumulated only in the first light receiving element P1, the information charges for one picture element are emitted every time three picture elements are transferred in the image pickup section 20*i* in which two second light receiving elements are disposed between the vertically arranged first light receiving elements P1. Additionally, in the first image pickup operation, since the same operation is repeated in a constant cycle, the transfer of the information charges on the present image frame overlaps the storage of the information charges for the next image frame. Specifically, while the information charges are accumulated by the image pickup section 20*i*, the information charges for the previous image frame are transferred by the storage section 20*s*.

The vertical transfer clocks φv1 to φv3 have reading pulses with frequencies one third of those of the transfer clocks φf1 to φf3, and further have line feeding pulses having cycles longer than those of the vertical transfer clocks φv1 to φv3, subsequent to the reading pulses. Additionally, the horizontal transfer clocks φh1 and φh2 have high-frequency output pulses in the interval of the transfer operation of the vertical transfer clocks φv1 to φv3. The operations by the vertical transfer clocks φv1 to φv3 and the horizontal transfer clocks φh1 and φh2 are the same as those of the CCD solid-state image pickup device 1 shown in FIG. 2 except the frequencies. Therefore, the information charges intermittently emitted from the image pickup section 20*i* are successively taken into the storage section 20*s*, temporarily held by the storage picture elements S, and transferred line by line to the horizontal transfer section 20*h* from the storage section 20*s*, all in a constant cycle. Subsequently, the information charges taken into the horizontal transfer section 20*h* are successively transferred/emitted toward the output section 20*d* by a unit of one picture element.

According to the first image pickup operation, the information charges accumulated in the first light receiving elements P1 of the image pickup section 20*i* are repeatedly read in a predetermined cycle, so that the image signal indicative of an animated image with a low resolution can be obtained.

As shown in FIG. 10, in the second image pickup operation, the transfer clocks φf1 and φf3 are fixed at low levels in the electric charge storage time, and have line feeding pulses of constant cycles in the subsequent electric charge transfer time. Moreover, the transfer clocks φf2 and φf2' are fixed at high levels in the electric charge storage time, and have line feeding pulses of the same cycles as those of the transfer clocks φf1 and φf3 in the electric charge transfer time. Therefore, in the image pickup section 20*i*, the information charges are accumulated in the first and second light receiving elements P1 and P2 during the electric charge storage time, and the information charges accumulated in the light receiving elements P1 and P2 are transferred line by line toward the storage section 20*s* in the electric charge transfer time. The vertical transfer clocks φv1 to φv3 are fixed at low levels during the electric charge storage time, and have line feeding pulses coincident with those of the transfer clocks φf1 to φf3 during the subsequent electric charge transfer time. Therefore, the storage section 20*s* repeats the same operation as the image pickup section 20*i*, and transfers the information charges successively transferred/emitted from the image pickup section 20*i* line by line to the horizontal transfer section 20*h* in the same cycle. The horizontal transfer clocks φh1 and φh2 are the same as those in the first image pickup operation, and have high-frequency output pulses in the interval of the transfer operation of the vertical transfer clocks φv1 to φv3. Therefore, the information charges accumulated in the light receiving elements P1 and P2 of the image pickup section 20*i* are transferred line by line to the horizontal transfer section 20*h* through the storage section 20*s* from the image pickup section 20*i* in a constant cycle, and transferred/emitted toward the output section 20*d* from the horizontal transfer section 20*h* in a unit of one picture element.

In the second image pickup operation, since the static image for one image frame is obtained, the information charges do not need to be repeatedly stored in the image pickup section 20*i*, and a sufficient time is allotted for the reading of the information charges accumulated in the image pickup section 20*i*. However, in the second image pickup operation performed by the solid-state image pickup device 20, since all information charges accumulated in the light receiving elements P1 and P2 of the image pickup section 20*i* cannot be taken into the storage section 20*s* as they are, most of the information charges are held in a position where photoelectric conversion operation can be performed even during the electric charge transfer time. To solve this problem, the generation of smearing electric charges is prevented by providing a shutter mechanism to cover the solid-state image pickup device 20 and closing the shutter mechanism to shield the image pickup section 20*i* against light upon completion of the electric charge storage time.

In the second image pickup operation, the information charges accumulated in the first and second light receiving elements P1 and P2 of the image pickup section 20*i* are successively read, with the image pickup section 20*i* being shielded against light, so that an image signal indicative of a static image with a high resolution can be obtained.

Figure 11:
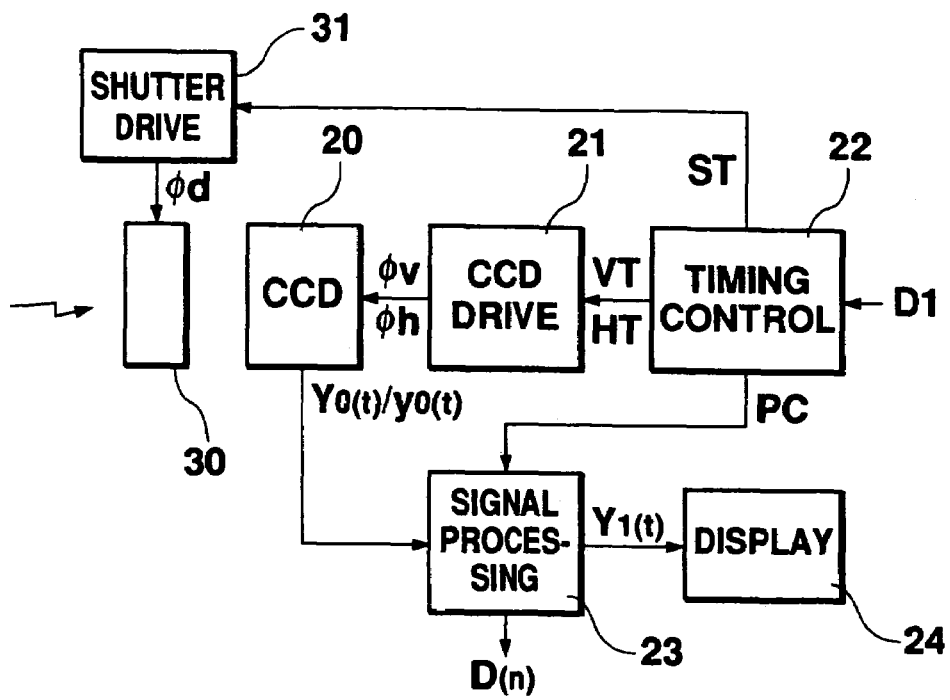
FIG. 11 is a block diagram showing a structure of an image pickup device in which a solid-state image pickup device according to the present invention is used.
Figure 12:
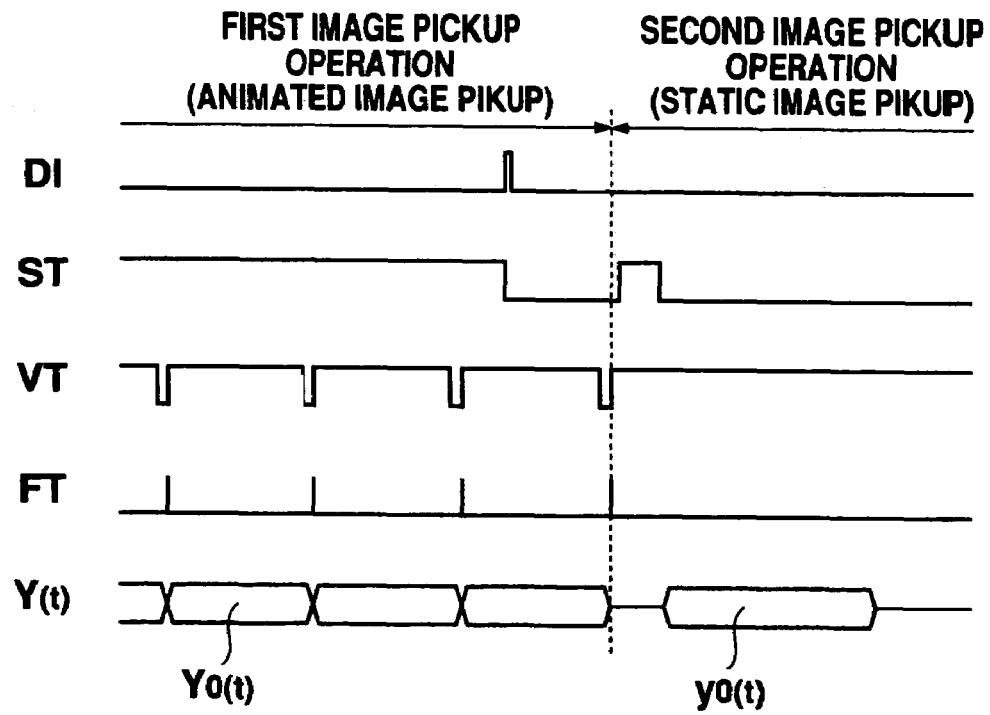
FIG. 12 is a timing chart showing the operation of the image pickup device shown in FIG. 11.

FIG. 11 is a block diagram showing a structure of an electronic still camera in which image signals indicative of animated and static images can be obtained by using the solid-state image pickup device 20 shown in FIG. 4, and FIG. 12 is a timing chart showing its operation.

The CCD solid-state image pickup device 20 is shown in FIG. 4 and comprises the storage section 20*s*, whose label is omitted, to one third relative to the image pickup section 20*i*, and is operated by various clocks supplied from a drive circuit 21 to output an image signal Y0(*t*).

A shutter mechanism 30 is disposed on an optical path where an object image is projected to the image pickup section 20*i* of the solid-state image pickup device 20 through a known lens mechanism, and shields the image pickup section 20*i* against light if necessary. The shutter mechanism 30 may be of any material that can control light transmission, and can be constituted using a liquid crystal panel, a shielding plate, or the like. A shutter drive circuit 31 generates a drive clock φd based on a shutter control signal ST supplied from a timing control circuit 22 described later to open/close the shutter mechanism 30. For example, while the shutter control signal ST is raised, the shutter mechanism 30 is opened. While the shutter control signal ST falls, the shutter mechanism 30 is closed.

The drive circuit 21 supplies the transfer clocks φf1 to φf3 and φf2', the vertical transfer clocks φv1 to φv3, and the horizontal transfer clocks φh1 and φh2 to the shift registers of the solid-state image pickup device 20, to transfer/output the information charges accumulated in a plurality of light receiving elements P1 and P2 in a predetermined sequence. Specifically, the information charges accumulated in the light receiving elements P1 and P2 of the image pickup section 20*i* in the constant electric charge storage time are transferred/emitted for each picture element in the predetermined sequence, to obtain the image signal $Y0(t)$ which is continuous in a line unit. The information charge transfer operation in the solid-state image pickup device 20 follows the first image pickup operation shown in FIG. 9 and the second image pickup operation shown in FIG. 10.

In the timing control circuit 22, a first image signal $Y0(t)$ indicative of an animated image is obtained by continuously operating the solid-state image pickup device 20 in the first image pickup operation, and a second image signal $y0(t)$ indicative of a static image is obtained by operating the solid-state image pickup device 20 only once in the second image pickup operation. Additionally, instructions are given to the shutter drive circuit 31 for operating the shutter mechanism 30 to shield the image pickup section 20*i* of the solid-state image pickup device 20 against light in such a manner that the shutter mechanism 30 is opened by the first image pickup operation and closed after a fixed time by the second image pickup operation to shield the image pickup section 20*i* of the solid-state image pickup device 20 against light.

In the first image pickup operation, the horizontal synchronous signal HT and the vertical scanning signal VT are generated based on reference clocks of constant cycles and supplied to the drive circuit 21, thereby periodically operating the drive circuit 21. Therefore, the solid-state image pickup device 20 repeats the image pickup only by the first light receiving elements P1 of the image pickup section 20*i* to output from the image pickup section 20*i* the first image signal $Y0(t)$ whose line number is reduced to one third. At this time, the shutter control signal ST remains raised, and the shutter drive circuit 31 keeps open the shutter mechanism 30. Additionally, a timing signal PC for standardizing the image signal $Y0(t)$ is simultaneously generated and supplied to the signal processing circuit 23 during the first image pickup operation.

When an image defining instruction DI is input while the first image pickup operation is continued, the first image pickup operation is completed to shift to the second image pickup operation. In the second image pickup operation, the shutter control signal ST is first raised to close the shutter mechanism 30 once, so that the image pickup section 20*i* of the solid-state image pickup device 20 is shielded against light. In this condition the frame transfer operation is performed to discharge the information charges accumulated in each light receiving element of the image pickup section 20*i*. In the discharge operation, after the shutter mechanism 30 is closed, the same operation as the first image pickup operation may be repeated once. After the discharge operation of unnecessary electric charges is completed, the shutter control signal ST is raised only for a predetermined time, and the shutter mechanism 30 is opened to accumulate the information charges in all light receiving elements of the image pickup section 20*i* of the solid-state image pickup device 20. The open time of the shutter mechanism 30 is set in accordance with the luminance of an object in such a manner that the average of the amount of the information charges accumulated in the image pickup section 20*i* of the solid-state image pickup device 20 falls within a predetermined range. Here, the optimum shutter open time may be set based on the average level of the first image signal $Y0(t)$ obtained in the first image pickup operation, by directly measuring the luminance of the object, or otherwise. In the second image pickup operation, the solid-state image pickup device 20 is not accompanied by the frame transfer operation, but the shielding of the image pickup section 20*i* by the shutter mechanism 30 is necessary instead. In the image pickup section 20*i* shielded against light by the shutter mechanism 30, the information charges accumulated in the light receiving elements having more line number than that of the storage section 20*s* are read by a unit of line. Therefore, the solid-state image pickup device 20 outputs the second image signal $y0(t)$ indicative of the picture element corresponding to each light receiving element P1 or P2 of the image pickup section 20*i*.

The signal processing circuit 23 takes the first image signal $Y0(t)$ emitted from the solid-state image pickup device 20, applies various processings such as sample holding, level correction and the like in accordance with the timing signal PC, and supplies an image signal $Y1(t)$ according to the predetermined format to a display 24. The signal processing circuit 23 includes an A/D converter and a D/A converter, in which the first image signal $Y0(t)$ is subjected to a signal processing as digital data, resets to the analog-value image signal $Y1(t)$ after the predetermined signal processing is completed, and supplied to the display 24. The signal processing circuit 23 repeats the aforementioned signal processing as the first image pickup operation until the timing control circuit 22 receives the image defining instruction DI. After the image defining instruction DI is received, digital image data D(n) corresponding to the second image signal $y0(t)$ indicative of the information charges from all the light receiving elements of the image pickup section 20*i* of the solid-state image pickup device 20 is supplied to the outside as a static image output. At this time, the image signal $Y1(t)$ whose picture element number is reduced is also supplied to the display 24 corresponding to the static image output. The display 24 is constituted of an LCD panel or the like for continuously displaying images picked up by the solid-state image pickup device 20 in response to the image signal $Y1(t)$ supplied from the signal processing circuit 23.

As aforementioned, since the substantial number of light receiving elements of the solid-state image pickup device 20 is changed between the first and second image pickup operations, the signal processing of the signal processing circuit 23 can be simplified in the first image pickup operation to obtain the image signal indicative of the low-resolution animated image.

In the above-mentioned embodiment, the number of lines of the storage picture elements in the storage section 20*s* of the solid-state image pickup device 20 is reduced to one third of the number of lines in the image pickup section 20*i*, but the reduction ratio may be ½ or ¼ or less.

As aforementioned, according to the first embodiment, by switching the substantial number of light receiving elements, the first image signal indicating the low-resolution animated image and the second image signal indicating the high-resolution static image can be obtained, respectively. Furthermore, since the chip size of the solid-state image pickup device can be reduced, the manufacture cost of the solid-state image pickup device can be cut down. Additionally, the signal processing of the first image signal obtained in the first image pickup operation can be simplified. Therefore, while the cost of the solid-state image pickup device is reduced, a high-quality static image can be obtained.

Second Embodiment

The structure of a second embodiment of the present invention is basically the same as that of the first embodiment, but, in the second embodiment, the electric potentials of the semiconductor substrate 11 are positively controlled.

Figure 13:
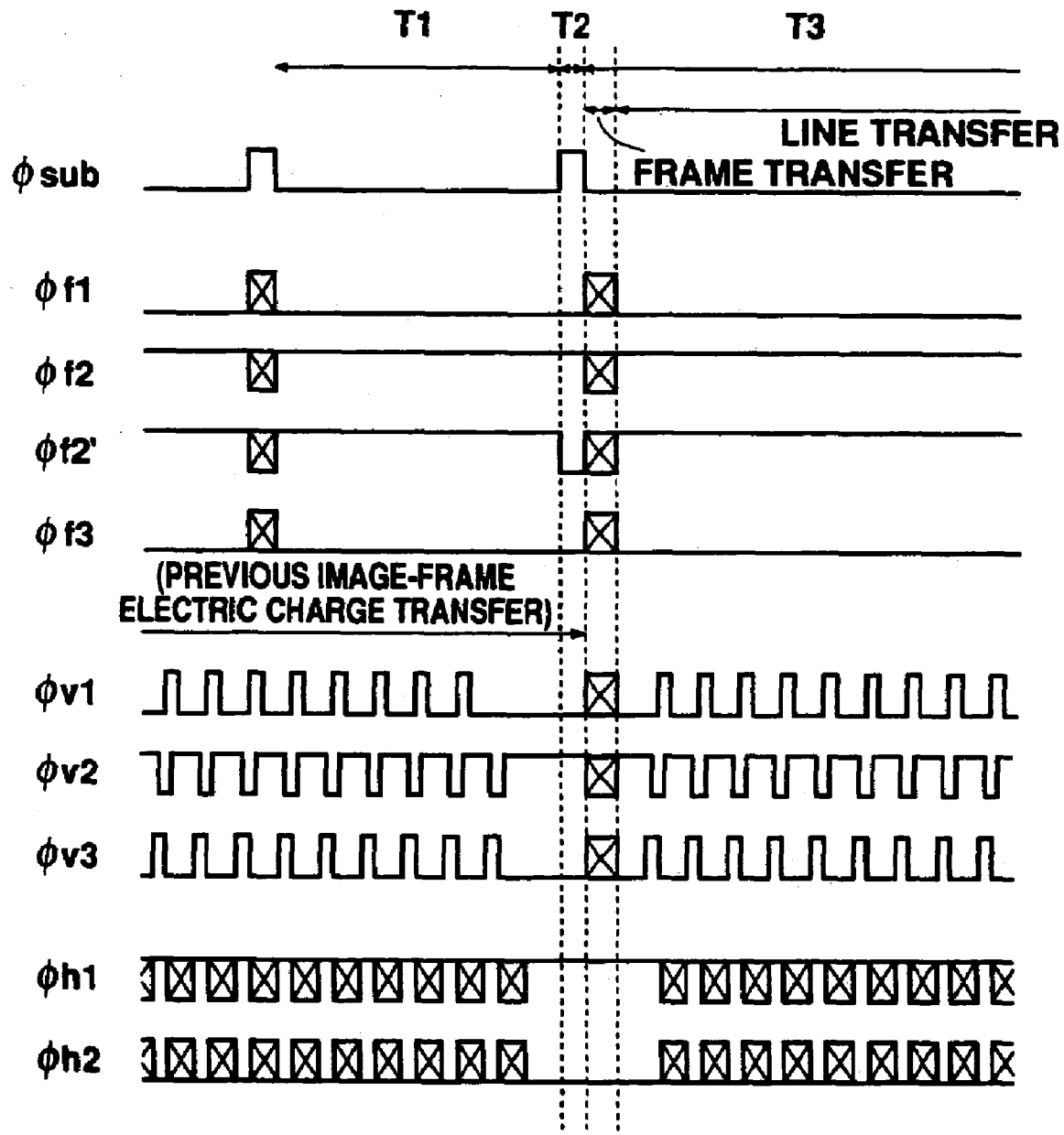
FIG. 13 is a timing chart showing a first image pickup operation in an operation method of a solid-state image pickup device according to a second embodiment.
Figure 14:
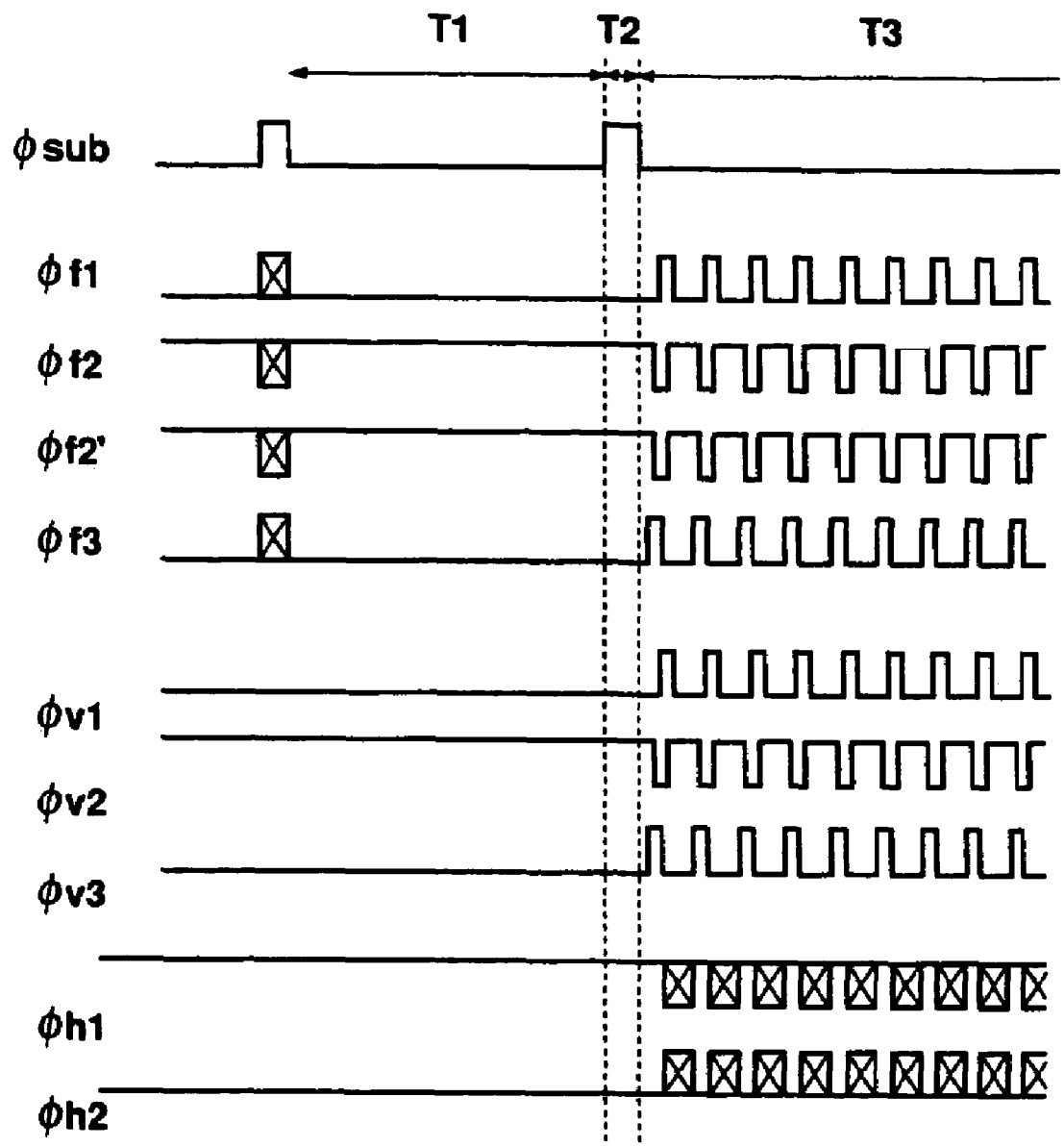
FIG. 14 is a timing chart showing a second image pickup operation in the operation method of the solid-state image pickup device of the second embodiment.

FIGS. 13 and 14 are timing charts of an operation method of a solid-state image pickup device according to the second embodiment, and show a first image pickup operation for fetching only the information charges of the first light receiving elements P1 and a second image pickup operation for fetching all the information charges of the first and second light receiving elements P1 and P2, respectively.

In this embodiment, three-phase transfer clocks φf1 to φf3, three-phase vertical transfer clocks φv1 to φv3, and two-phase horizontal transfer clocks φh1 and φh2 are used. In this case, in the image pickup section 20$i$, as shown in FIG. 4 described above, three transfer electrodes 15 per picture element are disposed for each light receiving element P1 or P2. Moreover, the transfer clocks φf1 and φf3 are applied to both-end transfer electrodes 15 of each light receiving element P1 or P2, the transfer clock φf2 is applied to the center transfer electrode 15 of the first light receiving element P1 and the transfer clock φf2' is applied to the center transfer electrode 15 of the second light receiving element P2. Furthermore, a substrate clock φsub synchronous with the transfer clocks φf1 to φf3 and φf2' is applied to the semiconductor substrate 11.

As shown in FIG. 13, in the first image pickup operation, the information charges are accumulated at a first time T1, and the accumulated amount of the information charges is regulated in the subsequent second time T2. Subsequently, the information charges are transferred in a third time T3 subsequent to the second time T2. The transfer of the information charges in the third time T3 is performed in two, stages: a frame transfer in which the information charges for one image frame whose picture element number is reduced are read from the image pickup section 20$i$ to the storage section 20$s$ at a high rate; and a line transfer in which the information charges are read line by line from the storage section 20$s$ to the horizontal transfer section 20$h$.

The transfer clocks φf1 to φf3 and φf2' include high-frequency discharge pulses immediately before the first time T1 and high-frequency reading pulses at the start of the third time T3 (frame transfer time). The transfer clock φf2 is fixed at a high level in the first and second-time T1 and T2, and the transfer clocks φf1 and φf3 are fixed at low levels during the first to third time T1-T3 except the frame transfer time. The transfer clock φf2' is fixed at a high level together with the transfer clock φf2 in the first time T1, and to a low level together with the transfer clocks φf1 and φf3 in the second time T2. Additionally, the substrate clock φsub is raised and fixed at a high level in the time of the discharge pulses of the transfer clocks φf1 to φf3 and φf2' and the second time T2, and fixed at a low level in the other times T1 and T3.

When the substrate clock φsub is raised to the high level and the discharge pulses of the transfer clocks φf1 to φf3 and φf2' are applied immediately before the first time T1, the potential on the semiconductor substrate 11 becomes deep, while the potential on the side of the transfer electrodes 15 periodically becomes shallow. At this time, since the potential profile which becomes deeper toward the depth of the semiconductor substrate 11 is formed under each light receiving element P1 or P2, the previously accumulated information charges in each light receiving element P1 or P2 are all discharged toward the semiconductor substrate 11.

Figure 15:
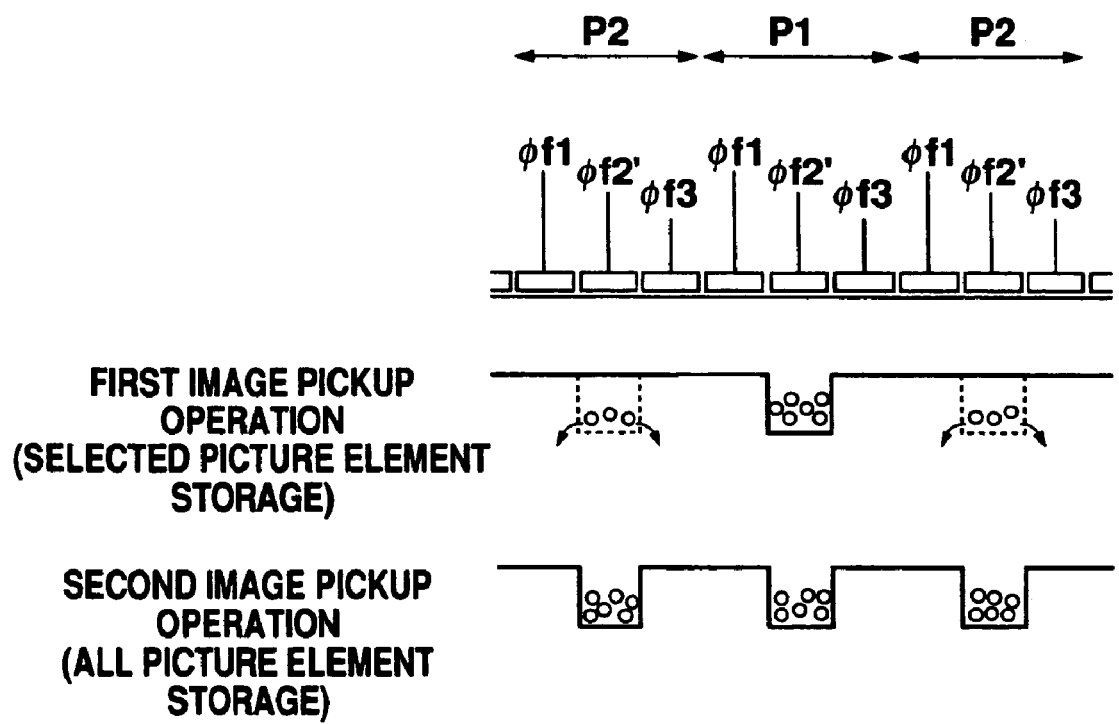
FIG. 15 is a diagram showing potentials inside the image pickup section of the solid-state image pickup device of the second embodiment.

When the transfer clocks φf1 and φf3 are fixed at low levels in the first and second time T1 and T2, as shown in FIG. 15, potential barriers for separating picture elements are formed on both ends of each light receiving element P1 or P2.

Figure 16:
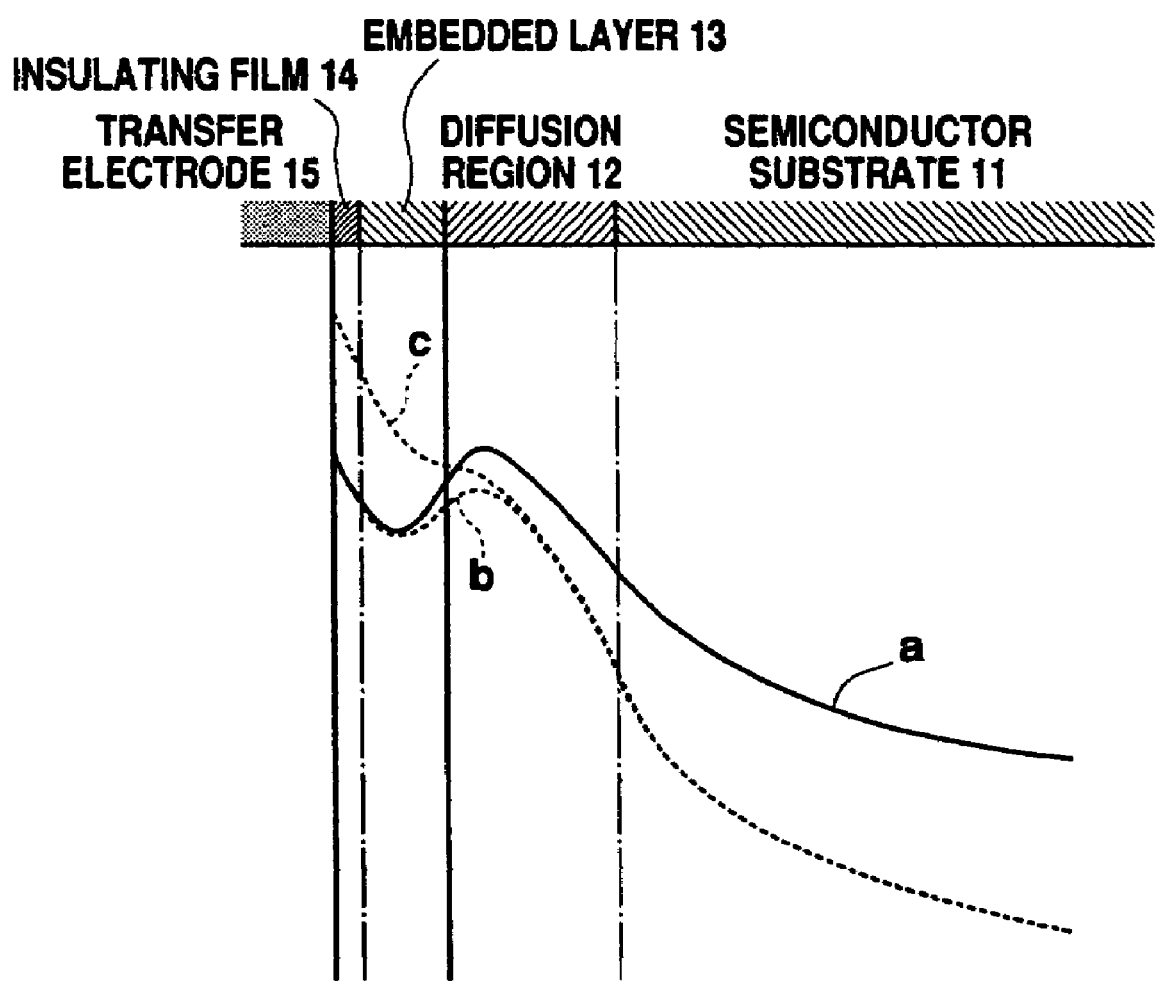
FIG. 16 is a potential profile view in a depth direction inside the image pickup section of the solid-state image pickup device of the second embodiment.

When the substrate clock φsub is fixed at the low level and the transfer clocks φf2 and φf2' are fixed at high levels in the first time T1, the potential profile as shown by a curve a of FIG. 16 is formed in a depth direction in the center of each light receiving element P1 or P2. Specifically, the potential profile becomes deeper as it is apart from the transfer electrodes 15, indicates a minimum value in the embedded layer 13 and a maximum value in the diffusion region 12 and becomes deeper again as it advances from the diffusion region 12 to the depth of the semiconductor substrate 11. Therefore, the information charges equivalent to a difference between the minimum value in the embedded layer 13 and the maximum value in the diffusion region 12 can be accumulated in each light receiving element P1 or P2.

When the clock φsub is raised to the high level, with the transfer clock φf2 being kept at the high level in the second time T2, the depth-direction potential profile in the center of the first light receiving element P1 changes as shown by a curve b of FIG. 16. Specifically, the potential on the side of the semiconductor substrate 11 becomes deep, and the maximum value in the diffusion region 12 is lowered accordingly. Therefore, the difference between the minimum value in the embedded layer 13 and the maximum value in the diffusion region 12 is reduced to reduce the storage capacity of the information charges, and the information charges exceeding the storage capacity and accumulated in the first time T1 are discharged toward the semiconductor substrate 11. Furthermore, in the second time T2, when the clock φsub rises to the high level while the transfer clock φf2' falls to the low level, the depth-direction potential profile in the center of the second light receiving element P2 changes as shown by a curve c of FIG. 16. Specifically, the potential on the side of transfer electrodes 15 becomes shallow at the same point that the potential on the side of the semiconductor substrate 11 becomes deep, and the minimum value in the embedded layer 13 and the maximum value in the diffusion region 12 are reversed. The potential barrier in the diffusion region 12 is then extinct, and the information charges accumulated in the first time T1 are all discharged toward the semiconductor substrate 11. Therefore, at the completion of the second time T2 of the first image pickup operation, as shown in FIG. 15, the information charges are accumulated only by the first light receiving element P1.

In the image pickup section 20$i$, the storage capacity of the information charges in the channel region is reduced by a delay of potential variation in the channel region relative to the electric potential variation of the transfer electrodes 15 or the like in the third time T3 when high frequencies are applied, rather than in the first time T1 when the electric potentials of the transfer electrodes 15 are fixed. For this reason, when an amount close to the saturation amount of information charges are accumulated in the first time T1, a part of the information charges may be left in the channel region instead of being transferred in the third time T3. To prevent the information charges from remaining to be transferred, in the second time T2, the storage capacity of the information charges in the channel region is regulated. The discharging of the information charges of the second light receiving element P2 and the regulation of the storage capacity are simultaneously performed in the second time T2.

At the third time T3, when the reading pulses of the transfer clocks $\phi$f1 to $\phi$f3 and $\phi$f2' are applied, with the substrate clock $\phi$sub being kept at the low level, the information charges accumulated in the first light receiving element P1 are transferred/emitted to the storage section 20s from the image pickup section 20i along the extending direction of the channel region. At this time, since the information charges are accumulated only in the first light receiving element P1, the information charges for one picture element are emitted every time three picture elements are transferred in the image pickup section 20i in which two second light receiving elements P2 are disposed between the vertically arranged first light receiving elements P1.

The vertical transfer clocks $\phi$v1 to $\phi$v3 have reading pulses with frequencies one third those of the transfer clocks $\phi$f1 to $\phi$f3 at the start of the electric charge transfer time, and have line feeding pulses of constant cycles, subsequent to the reading pulses. Additionally, the horizontal transfer clocks $\phi$h1 and $\phi$h2 have high-frequency output pulses corresponding to the line feeding pulses of the vertical transfer clocks $\phi$v1 to $\phi$v3. The operation by the vertical transfer clocks $\phi$v1 to $\phi$v3 and the horizontal transfer clocks $\phi$h1 and $\phi$h2 is the same as in the above-mentioned first embodiment, and the information charges are transferred in the same manner.

According to the first image pickup operation, the information charges accumulated in the first light receiving element P1 are repeatedly read in a predetermined time, so that the image signal having a low resolution and indicating an animated image can be obtained.

As shown in FIG. 14, in the second image pickup operation, the information charges are accumulated in the first time T1, and the storage amount of the information charges is restricted in the subsequent second time T2. Subsequently, the information charges are transferred in the third time T3 subsequent to the second time T2. The transfer of the information charges in the third time T3 is performed only by the line transfer in which the information charges are read line by line from the image pickup section 20i through the storage section 20s.

The transfer clocks $\phi$f1 to $\phi$f3 and $\phi$f2' have high-frequency discharge pulses immediately before the first time T1 and line feeding pulses of constant cycles in the third time T3. The transfer clocks $\phi$f2 and $\phi$f2' are coincident with each other and fixed at low levels in the first and second time T1 and T2. The transfer clocks $\phi$1 and $\phi$f3 are fixed at low levels in the first and second time T1 and T2. Additionally, the substrate clock $\phi$sub is raised and fixed at a high level in the time of the discharge pulses of the transfer clocks $\phi$f1 to $\phi$f3 and f2' and the second time T2, and fixed at a low level in the other times T1 and T3.

When the substrate clock $\phi$sub is raised to a high level and the discharge pulses of the transfer clocks $\phi$f1 to $\phi$f3 and $\phi$f2' are applied immediately before the first time T1, the potential on the side of the semiconductor substrate 11 becomes deep, while the potential on the side of the transfer electrodes 15 periodically becomes shallow. The operation is the same as the first image pickup operation.

When the transfer clocks $\phi$f1 and $\phi$f3 are fixed at low levels in the first and second time T1 and T2, as shown in FIG. 15, potential barriers for separating picture elements are formed on both ends of each light receiving element P1 or P2.

When the substrate clock $\phi$sub is fixed at a low level and the transfer clocks $\phi$f2 and $\phi$f2' are fixed at high levels in the first time T1, the potential profile as shown by the curve a of FIG. 16 is formed in a depth direction in the center of each light receiving element P1 or P2 in the same manner as in the first image pickup operation. Therefore, the information charges equivalent to a difference between the minimum value in the embedded layer 13 and the maximum value in the diffusion region 12 can be accumulated in each light receiving element P1 or P2.

When the clock $\phi$sub is raised to high level, with the transfer clocks $\phi$f2 and $\phi$f2' being kept at high levels in the second time T2, in the same manner as in the first image pickup operation, the depth-direction potential profile of the center of the each light receiving element P1 or P2 changes as shown by the curve b of FIG. 16. Therefore, the difference between the minimum value in the embedded layer 13 and the maximum value in the diffusion region 12 is reduced to reduce the storage capacity of the information charges, and the information charges exceeding the storage capacity and accumulated in the first time T1 are discharged toward the semiconductor substrate 11. In the second image pickup operation, at the completion of the second time T2, as shown in FIG. 15, the information charges are accumulated in each light receiving element P1 or P2. The restriction of the storage capacity of the information charges in the second time T2 is the same as in the first image pickup operation.

When the line feeding pulses of the transfer clocks $\phi$f1 to $\phi$f3 and $\phi$f2' are applied, with the substrate clock $\phi$sub being kept at a low level in the third time T3, the information charges accumulated in each light receiving element P1 or P2 are transferred to the storage section line by line along the extending direction of the channel region.

The vertical transfer clocks $\phi$v1 to $\phi$v3 have line feeding pulses coincident with the transfer clocks $\phi$f1 to $\phi$f3 in the third time T3. In the third time T3, the transfer operation by the vertical transfer clocks $\phi$v1 to $\phi$v3 is the same as the transfer operation by the transfer clocks $\phi$f1 to $\phi$f3, and the information charges are transferred to the horizontal transfer section 20h from the image pickup section 20i through the storage section 20s in a unit of line. The horizontal transfer clocks $\phi$h1 and $\phi$h2 have high-frequency output pulses corresponding to the line feeding pulses of the vertical transfer clocks $\phi$v1 to $\phi$v3 in the third time T3. The horizontal transfer clocks $\phi$h1 and $\phi$h2 are the same as those in the first image pickup operation, and the information charges transferred/emitted to the horizontal transfer section 20h from the image pickup section 20i through the storage section 20s in a unit of line are transferred/emitted from the horizontal transfer section 20h in picture element units.

In the second image pickup operation, since the static image for one image frame is obtained, the information charges need not be repeatedly stored in the image pickup section 20i, and a sufficient time is allotted for the reading of the information charges accumulated in the image pickup section 20i. However, in the second image pickup operation, since all information charges accumulated in the light receiving elements P1 and P2 of the image pickup section 20i cannot be taken into the storage picture elements of the storage section 20s as they are, most of the information charges are held in a position where photoelectric conversion operation can be performed even during the electric charge transfer time. To solve the problem, by providing a shutter mechanism to cover the solid-state image pickup device 20 and closing the shutter mechanism to shield the image pickup section 20i against light upon completion of the electric charge storage time, the generation of smearing electric charges is prevented.

According to the second image pickup operation, the information charges accumulated in the first and second light receiving elements P1 and P2 of the image pickup section 20i are successively read with the image pickup section 20i being shielded against light, so that an image signal having a high resolution and indicating a static image can be obtained.

The structure of an electronic still camera in which the first image signal indicating an animated image and the second image signal indicating a static image are obtained by using the operation method of the second embodiment is the same as the structure shown in FIG. 11, and its entire operation is the same as illustrated.

Third Embodiment

Figure 17:
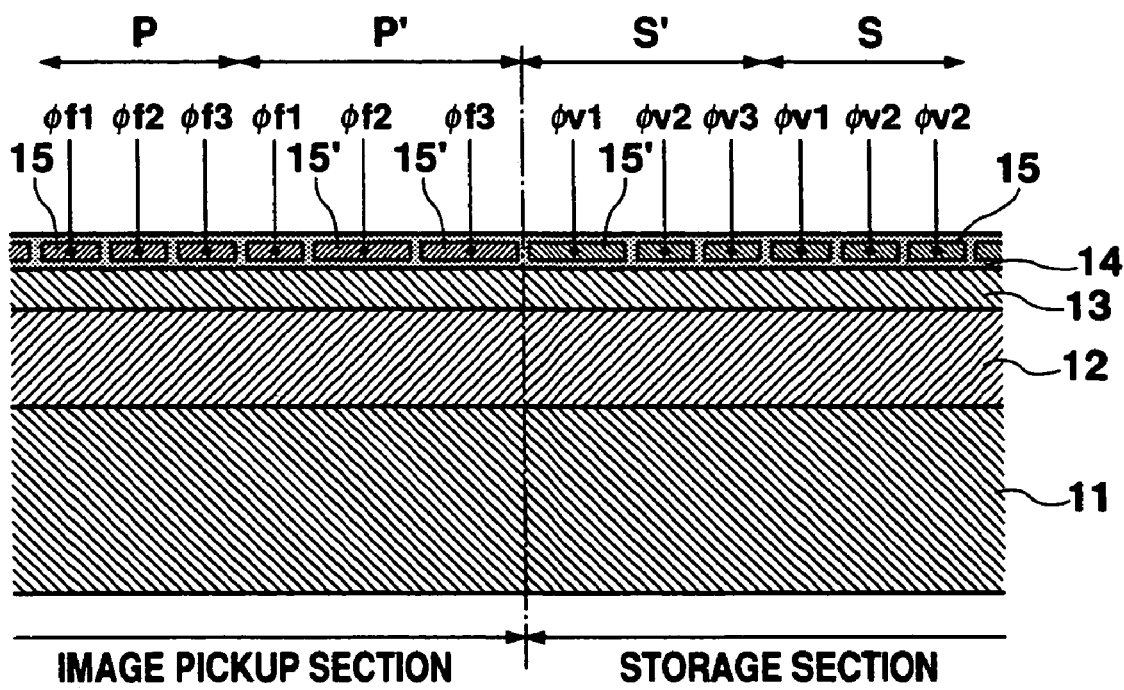
FIG. 17 is a sectional view showing a structure of an image pickup section of a solid-state image pickup device according to a third embodiment.

FIG. 17 is a sectional view showing a structure of a solid-state image pickup device according to a third embodiment of the present invention. The solid-state image pickup device of the present embodiment is of a frame transfer system, and FIG. 17 shows a vicinity of a boundary between an image pickup section and a storage section.

The structure is the same as that of the second embodiment, except that a portion of the transfer electrodes 15' defining one light receiving element P' adjacent to the storage section among a plurality of light receiving elements P and one storage picture element S' adjacent to the image pickup section among a plurality of storage picture elements S are formed broader in an electric charge transfer direction than the other transfer electrodes 15, and have their channel lengths lengthened.

Three-phase frame transfer clocks $\phi f1$ to $\phi f3$ are applied to the transfer electrodes 15 and 15' of the image pickup section, and three-phase vertical transfer clocks $\phi v1$ to $\phi v3$ are applied to the transfer electrodes 15 and 15' of the storage section, to control potentials in channel regions. In the image pickup operation, the frame transfer clocks $\phi f1$ and $\phi f3$ inactivate the transfer electrodes 15 positioned on both ends of each light receiving element P, and form potential barriers for electrically separating adjoining light receiving elements P. Additionally, the frame transfer clock $\phi f2$ turns on the transfer electrode 15 positioned in the center of the light receiving element P, and forms a potential well for accumulating the information charges. Furthermore, in the transfer operation, the frame transfer clocks $\phi f1$ to $\phi f3$ and the vertical transfer clock $\phi v1$ to $\phi v3$ repeatedly activate/off each transfer electrode 15 at a high rate to move the potential well in such a manner that the information charges accumulated in the potential well are transferred in one direction. Here, by setting cycles of the vertical transfer clocks $\phi v1$ to $\phi v3$ an integer number of times longer than those of the frame transfer clocks $\phi f1$ to $\phi f3$, the number of picture elements can be reduced in the process of transfer of information charges from the image pickup section to the storage section. Specifically, by setting the cycles of the vertical transfer clocks $\phi v1$ to $\phi v3$ n-times (n: integer) longer than the cycles of the frame transfer clocks $\phi f1$ to $\phi f3$, the information charges transferred/emitted from the image pickup section are taken into the storage section only for one picture element among n-picture elements.

In the CCD solid-state image pickup device having a vertical overflow drain structure, the potential profiles as shown in FIG. 6 are formed in the depth direction of the semiconductor substrate 11.

When the transfer electrodes 15 and 15' are activated, i.e. when the electric potentials applied to the transfer electrodes 15 and 15' are raised, the potential profile is formed deep in the embedded layer 13 (channel region) as shown by the curve a. Therefore, the information charges can be accumulated only to compensate for the difference between the minimum value in the embedded layer 13 and the maximum value in the diffusion layer 12 on the other hand, when the transfer electrodes 15 and 15' are inactivated, i.e., when the electric potentials applied to the transfer electrodes 15 and 15' are lowered, the potential profile is formed shallow in the embedded layer 13 (channel region) as shown by the curve b. Therefore, the potential barriers in the diffusion region 12 are extinct, and the information charges generated in the channel region are discharged toward the semiconductor substrate 11 along the potential gradient.

The frame transfer clocks $\phi f1$ to $\phi f3$ and the vertical transfer clocks $\phi v1$ to $\phi v3$ activate the transfer electrodes 15 and 15' in a sequential transfer direction, with the transfer electrodes being overlapped for a predetermined time. At this time, if the timing at which the transfer electrodes 15 and 15' are continuously activated is delayed, the information charges which are being transferred are discharged toward the semiconductor substrate 11. To solve the problem, by lengthening the cycles of the vertical transfer clocks $\phi v1$ to $\phi v3$ and intentionally delaying the timing when the transfer electrodes 15' of the storage section are activated, only a part of the information charges of the light receiving elements can be taken into the storage picture element S while being transferred from the image pickup section to the storage section. At this time, the information charges which are not taken into the storage picture element S are discharged from the output end of the image pickup section, i.e., the light receiving element P' adjacent to the storage section. For this reason, by forming longer channel lengths of the transfer electrodes 15' in the boundary of the image pickup section and the storage section, the information charges discharged toward the semiconductor substrate 11 are prevented from being mixed in the information charges held in the storage picture element S'.

Figure 18:
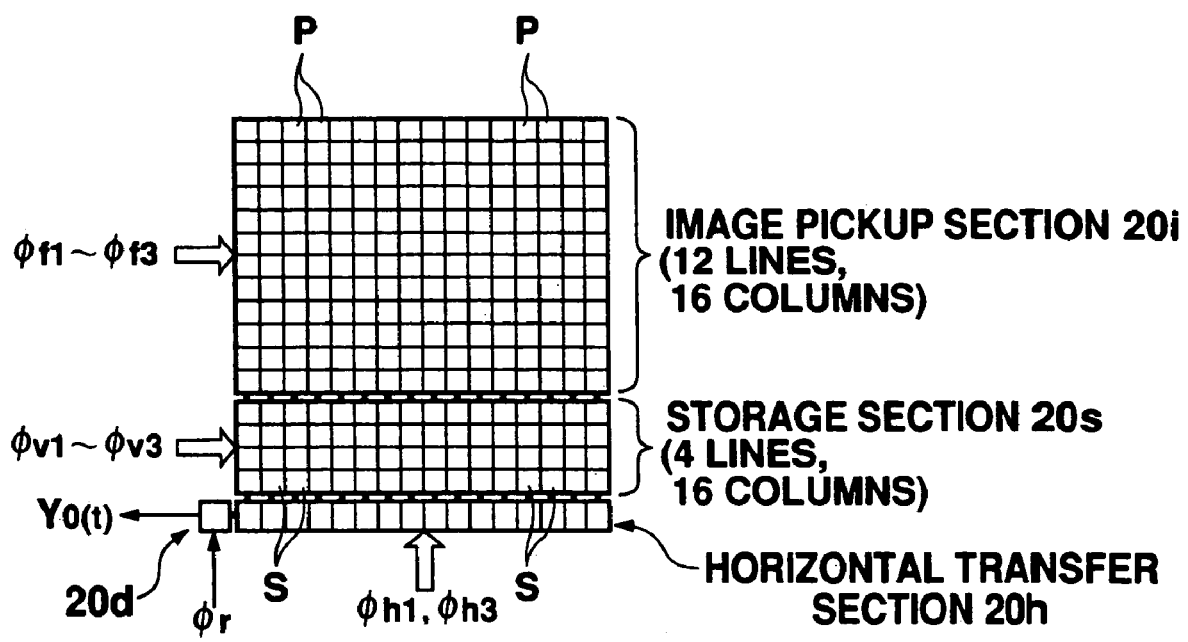
FIG. 18 is a plan view diagrammatically showing the solid-state image pickup device of the third embodiment.

FIG. 18 is a schematic diagram showing the structure of the frame transfer system CCD solid-state image pickup device according to the third embodiment. In FIG. 18, for simplicity of understanding, the arrangement of the light receiving elements P is shown in 12 lines by 16 columns. In the third embodiment, in order to transfer the information charges accumulated in each light receiving element P, the frame transfer clocks $\phi f1$ to $\phi f3$ are clocked on high frequencies, before the information charges are transferred to the storage section 20s (frame transfer).

Figure 19:
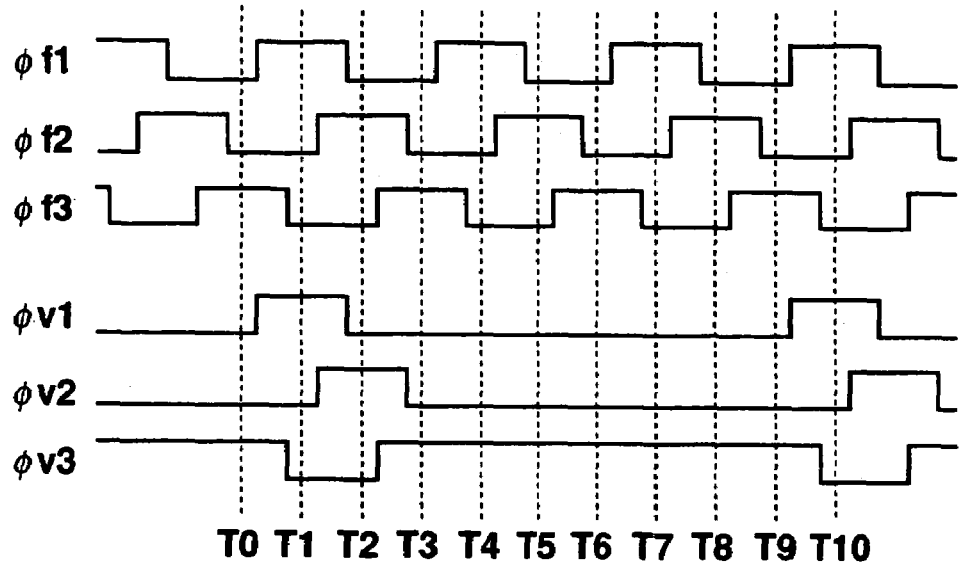
FIG. 19 is a diagram showing waveforms of transfer clocks for realizing a first operation method of the solid-state image pickup device according to the third embodiment.
Figure 20:
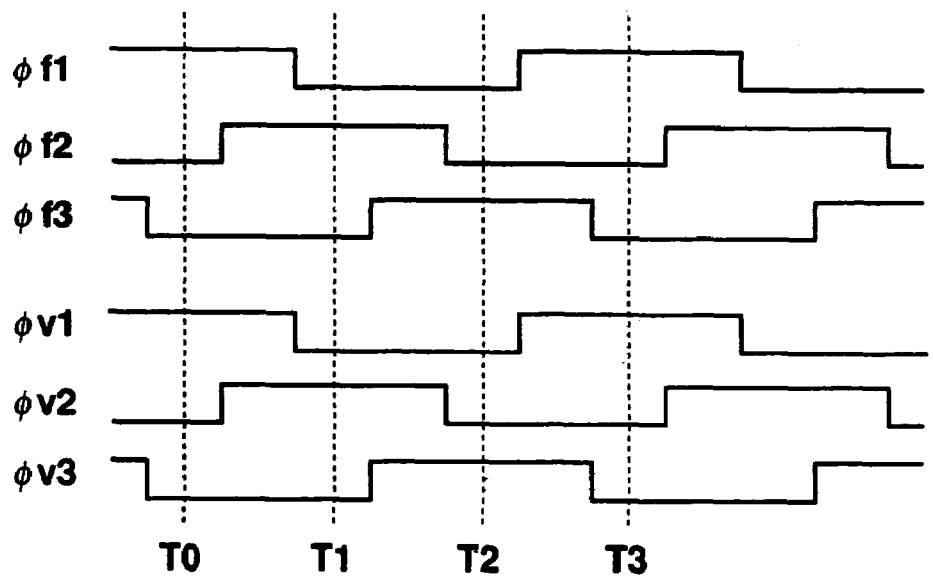
FIG. 20 is a diagram showing waveforms of transfer clocks for realizing a second operation method of the solid-state image pickup device according to the third embodiment.

FIGS. 19 and 20 show waveforms of transfer clocks for realizing the operation method of the solid-state image pickup device according to the present invention: FIG. 19 shows a first operation for reducing the number of picture elements to read information charges; and FIG. 20 shows a second operation for reading the information charges of all the picture elements. In this embodiment, the number of picture elements is reduced to one third in the first operation. Additionally, the cycles of the transfer clocks in the second operation are sufficiently longer (usually, several hundred times) than the cycles of the transfer clocks in the first operation, and FIG. 20 is reduced in size in a time axis direction as compared with FIG. 19.

After the solid-state image pickup device accumulates the information charges generated through photoelectric conversion in the first time (storage time) into each light receiving element P, the information charges are transferred/emitted from each light receiving elements P via the storage picture element S in the second time (transfer time). During the storage time, one of the frame transfer clocks φf1 to φf3, e.g., the frame transfer clock φf3 is fixed at a high level, while the other frame transfer clocks φf1 and φf2 are fixed at low levels. Therefore, the information charges generated by the photoelectric conversion are accumulated under the transfer electrode 15 to which the frame transfer clock φf3 is applied. The operation in the storage time in the first operation is coincident with that in the second operation.

In the transfer time, in the first operation, the frame transfer clocks φf1 to φf3 alternately repeat rising and falling in constant cycles, so that a mutual phase difference is set to ⅓ cycle. At this point, the vertical transfer clocks φv1 to φv3 repeat rising and falling in cycles three times longer than those of the frame transfer clocks φf1 to φf3, so that a mutual phase difference is set to ⅑ cycle. Furthermore, the rising of the vertical transfer clock φv is delayed by ⅔ cycle, and periods when the vertical transfer clocks φv1 to φv3 are raised are mutually overlapped only by 1/18 cycle. The first operation includes a transfer operation in which the information charges taken from the light receiving element P into the storage picture element S are transferred/emitted by each picture element according to a horizontal scanning timing. On the other hand, in the second operation, the frame transfer clocks φf1 to φf3 and the vertical transfer clocks φv1 to φv3 are coincident with one another and alternately repeat rising and falling in constant cycles, and a mutual phase difference is set to ⅓ cycle. In the second embodiment, the information charges are taken from the light receiving element P of the image pickup section into the storage picture element S of the storage section according to the horizontal scanning timing, and continuously transferred/emitted by each picture element from the storage picture element S.

Figure 21:
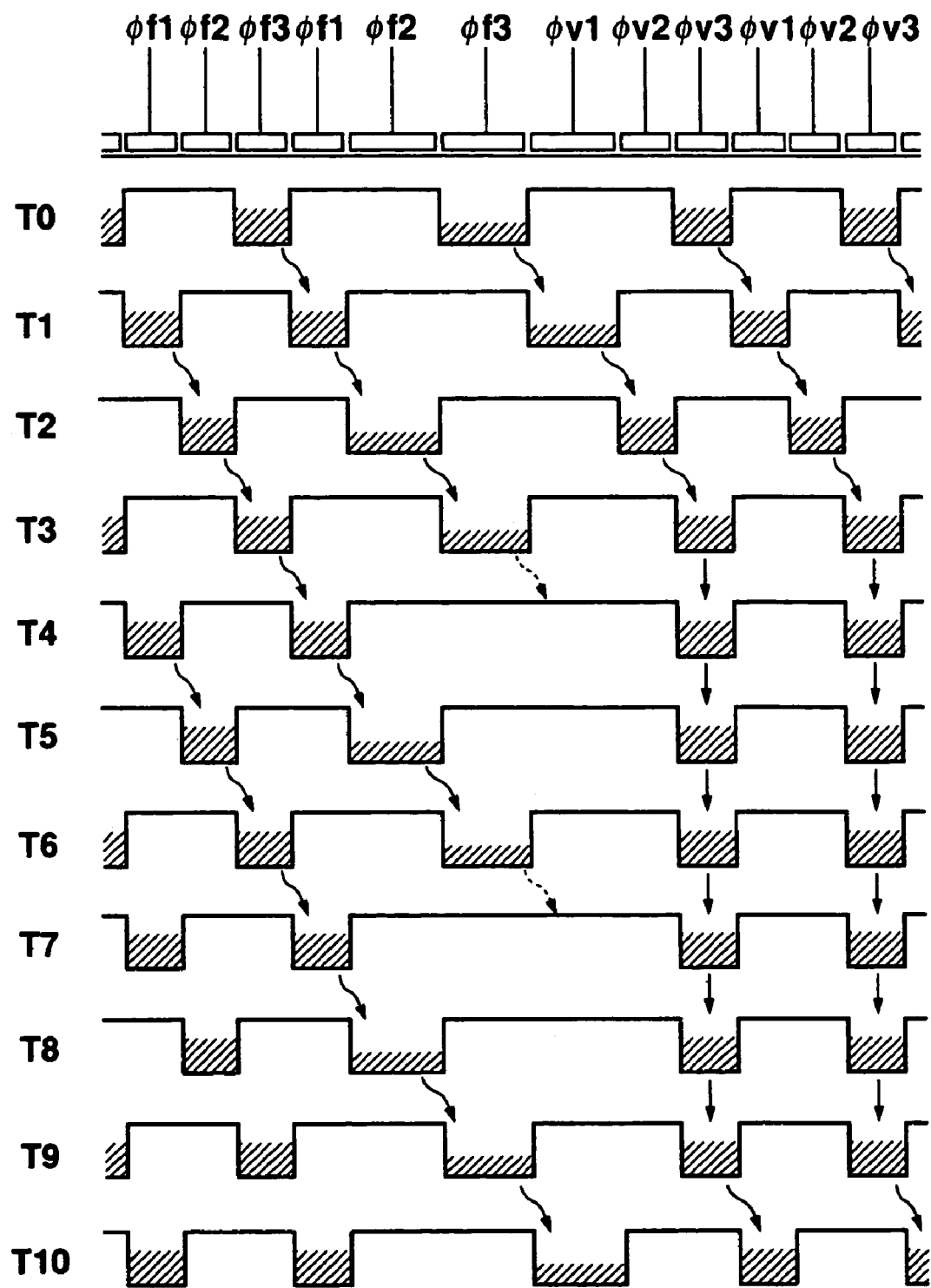
FIG. 21 is a diagram showing potentials in a first operation of the operation method of the third embodiment.

FIG. 21 is a diagram showing potentials in the first operation. FIG. 21 corresponds to FIG. 19, and shows the same portion as FIG. 17.

At a time T0 when the frame transfer clock φf3 and the vertical transfer clock φv3 rise and the transfer clocks φf1 and φf2 and the vertical transfer clocks φv1 and φv2 fall, the potential well is formed under the transfer electrode 15 to which the frame transfer clock φf3 or the vertical transfer clock φv3 is applied. The information charges are stored in the potential well. At time T1 to T3, the frame transfer clocks φf1 to φf3 are successively reversed with a time difference of ⅓ cycle, and the information charges accumulated under the transfer electrode 15 to which the frame transfer clock φf3 is applied are transferred till the light receiving element P of one picture element ahead. Additionally, the vertical transfer clocks φv1 to φv3 are successively reversed with a time difference of ⅑ cycle, and the information charges accumulated under the transfer electrode 15 to which the vertical transfer clock φv3 is applied are transferred till the storage picture element S of one picture element ahead.

At a time T4, the frame transfer clocks φf1 and φf3 are reversed, with the vertical transfer clocks φv1 to φv3 being fixed, and the information charges accumulated under the transfer electrode 15 to which the frame transfer clock φf3 is applied are transferred to below the transfer electrode 15 to which the vertical transfer clock φv1 is applied. At this time, in the light receiving element P' adjacent to the storage section, since the transfer electrode 15', to which the vertical transfer clock φv1 is applied ahead of the transfer electrode 15' to which the frame transfer clock φf3 is applied, remains off, all the information charges of the picture element are discharged toward the semiconductor substrate 11. At this point, in the storage picture element S' adjacent to the light receiving element P', the information charges are held in a position farthest from the light receiving element P', i.e., under the transfer electrode 15 to which the vertical transfer clock φv3 is applied. In addition, the transfer electrodes 15' on opposite sides of the transfer electrode 15' to which the frame transfer clock φf3 is applied are formed with lengthened channel lengths. For this reason, even when the information charges are discharged toward the semiconductor substrate 11 in the channel region under the transfer electrode 15' to which the frame transfer clock φf3 is applied, a part of the information charges can be prevented from being mixed into the information charges held by the storage picture element S'.

In time T5 and T6, in the same manner as for time T2 and T3, the frame transfer clocks φf1 to φf3 are successively reversed, and the information charges accumulated under the transfer electrode 15 to which the frame transfer clock φf1 is applied are transferred to below the next transfer electrode 15 to which the frame transfer clock φf3 is applied. At time T7, in the same manner as at time T4, the frame transfer clocks φf1 and φf3 are reversed, and the information charges accumulated under the transfer electrode 15 to which the frame transfer clock φf3 is applied are transferred to below the transfer electrode 15 to which the frame transfer clock φf1 is applied. Additionally, in the light receiving element P' the information charges for one picture element are discharged toward the semiconductor substrate 11. The transfer operation in time T8 and T9 is coincident with the transfer operation in time T5 and T6. Additionally, in the time T5 till T9, in the same manner as in the time T3 and T4, the vertical transfer clocks φv1 to φv3 are continuously fixed.

Subsequently, at time T10, in the same manner as at time T1, the frame transfer clocks φf1 and φf3 together with the vertical transfer clocks φv1 and φv3 are reversed, and the information charges accumulated under the transfer electrode 15 to which the frame transfer clock φf3 or the vertical transfer clock φv3 is applied are transferred to below the transfer electrode 15 to which the frame transfer clock φf1 or the vertical transfer clock φv1 is applied. At time T10, in the light receiving element P' the information charges are not discharged toward the semiconductor substrate 11, but transferred to the storage picture element S'.

By repeating the above-mentioned operation from time T1 till T10, the discharge of the information charges for two picture elements and the output of the information charges for one picture element are repeated, so that one third of the information charges accumulated in a plurality of light receiving elements P are taken into the storage picture element S. The information charges once taken into the storage picture element S are transferred/emitted in a unit of picture element, when the vertical transfer clocks φv1 to φv3 repeat rising and falling according to the horizontal scanning cycle.

Figure 22:
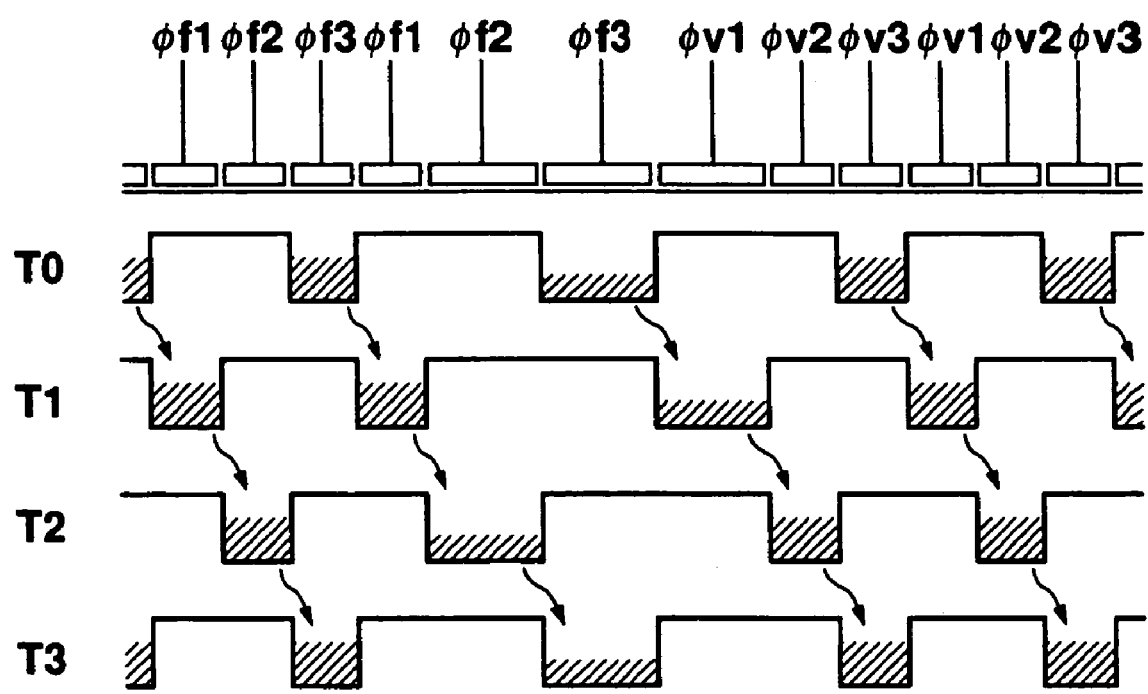
FIG. 22 is a diagram showing potentials in a second operation of the operation method of the third embodiment.

FIG. 22 is a diagram showing potentials in the second operation. FIG. 22 corresponds to FIG. 10, and shows the same portion as FIG. 17.

At a time T0, the frame transfer clock φf3 and the vertical transfer clock φv3 rise, the frame transfer clocks φf1 and φf2 and the vertical transfer clocks φv1 and φv2 fall, and the potential well is formed under the transfer electrode 15 to which the frame transfer clock φf3 or the vertical transfer clock φv3 is applied, so that the information charges are stored in the potential well.

At time T1 till T3, the frame transfer clocks φf1 to φf3 and the vertical transfer clocks φv1 to φv3 are successively reversed. The transfer operation in time T1 till T3 is coincident with the operation in time T1 till T3 of the first operation shown in FIG. 21. However, the operation cycle is set coincident with the horizontal scanning cycle, and is sufficiently (about 900 times at maximum) longer than that of the first operation.

By repeating the above-mentioned operation of time T1 till T3, the information charges accumulated in a plurality of light receiving elements P are transferred/emitted via the storage picture element S by each picture element at the timing following the horizontal scanning cycle. In the second operation, however, during the transfer time, most of the information charges are held in the light receiving element P in which photoelectric conversion is continued. Therefore, by providing a shutter mechanism to cover each light receiving element P and closing the shutter mechanism to shield the light receiving element P from light during the transfer time, the generation of smearing electric charges must be prevented.

According to the third embodiment, in the process of transfer from the image pickup section to the storage section of the solid-state image pickup device, the information charges can be read only from the specific picture element to reduce the number of picture elements. Since the information charges to be discharged to thin out the picture elements are discharged toward the substrate in the transfer electrodes whose channel lengths are formed long, the mixing of a portion of the discharged charges with the information charges held in the storage picture element can be prevented. Therefore, the processing of the image signal can be simplified, the image signal can be prevented from being deteriorated, and the reduction of circuit scale and cost can be expected. Moreover, since the chip size of the solid-state image pickup device can be reduced due to the reduction of the storage section, the manufacturing cost of the solid-state image pickup device itself can also be reduced.

What is claimed is:

1. A solid-state image pickup device for generating image signals in accordance with incident light, comprising:
    a semiconductor substrate having one conductive type; a semiconductor region formed on one surface of said semiconductor substrate and having a conductive type opposite to said semiconductor substrate;
    a plurality of channel regions extending in a column direction respectively in said semiconductor region;
    a plurality of picture elements in which electric charges are accumulated defined in each portion of said plurality of channel regions;
    a plurality of transfer electrodes, extending in a row direction on said semiconductor region, for transferring the electric charges accumulated in said plurality of channel regions and
    a drive circuit for giving a first electric potential for forming a potential barrier of a predetermined height between the channel regions and the semiconductor substrate region to a first set of a plurality of picture elements and giving a second electric potential for extinguishing the potential barrier between the channel regions and the semiconductor substrate region to a second set of a plurality of picture elements in a first image pickup operation, and
    for giving the first electric potential for forming the potential barrier of the predetermined height between the channel regions and the semiconductor substrate region to both of the first set of picture elements and the second set of picture elements in a second image pickup operation,
    first image signals of continuous frame by frame being obtained by repeatedly performing the first image pickup operation, and second image signals indicative of one frame being obtained by the second image pickup operation.

2. The solid-state image pickup device according to claim 1 which further comprises:
    a shutter mechanism for controlling light incident on the first and second set of the picture elements,
    said shutter mechanism permitting the light to be incident on the first set and the second set for only a predetermined period during the second image pickup operation.

3. The solid-state image pickup device according to claim 1 wherein the predetermined period for which the light is incident on the first and second set of the picture elements during the second image pickup operation is extended or reduced in accordance with the intensity of the incident light.

4. A solid-state image pickup device for generating image signals in accordance with incident lights, comprising:
    a semiconductor substrate having one conductive type;
    a semiconductor region formed on one surface of said semiconductor substrate and having a conductive type opposite to said semiconductor substrate;
    a plurality of channel regions extending in a column direction respectively in said semiconductor region;
    a plurality of picture elements in which information charges are accumulated defined in each portion of said plurality of channel regions;
    a plurality of transfer electrodes, extending in a row direction on said semiconductor region, for transferring the electric charges accumulated in said plurality of channel regions and
    a drive circuit for applying, to said semiconductor substrate, a first electric potential for forming a potential barrier of a predetermined height between the channel regions and the semiconductor substrate region in a first period and a second electric potential for restricting the height of the potential barrier between the channel regions and the substrate regions in a second period subsequent to the first period,
    for applying a third electric potential for keeping the potential barrier between the channel regions and the substrate region to a first set of a plurality of picture elements among said plurality of picture elements in the first period and the second period, and
    for applying, to a second set of a plurality of picture elements among said plurality of picture elements, the third electric potential during the first period, and a fourth electric potential for extinguishing the potential barrier between the channel regions and the semiconductor substrate region during the second period,
    the electric charges accumulated in the first set of the picture elements during the first period being transferred in a third period after an elapse of the second period.

5. The solid-state image pickup device according to claim 4 wherein said first and second sets of picture elements are both aligned in the row direction, the first set of the picture elements are disposed at intervals in the column direction, and the second set of the picture elements are interposed between the first set of the picture elements.

6. The solid-state image pickup device according to claim 5 wherein storage elements in which the electric charges transferred from the picture elements are received and accumulated are disposed adjacent to the first and second sets of the picture elements, and the number of these storage elements corresponds to that of the first set of the picture elements.

7. The solid-state image pickup device according to claim 4 wherein said drive circuit further includes
a second image pickup operation for applying said third electric potential to said transfer electrodes for said first and second picture elements during said first and second periods,
the first image pickup operation is repeatedly performed over said first period to the third period to obtain a first image signal of continuous frame by frame and
the second image pickup operation is performed to obtain a second image signal indicative of a single static image frame.

8. The solid-state image, pickup device according to claim 7 which further comprises:
a shutter mechanism for controlling light incident on the first and second set of the picture elements,
said shutter mechanism permitting the light to be incident on the first set of the picture elements and the second set of the picture elements only for a predetermined period during the second image pickup operation.

9. The solid-state image pickup device according to claim 8 wherein the predetermined period for which the light is incident on the first and second set of the picture elements during the second image pickup operation is extended or reduced in accordance with the intensity of the incident light.

10. The solid-state image pickup device according to claim 4 wherein, at the start of said first period of said second image pickup operation, said drive circuit applies said second electric potential to said semiconductor substrate, and applies said fourth electric potential to said transfer electrodes to distinguish the potential barrier between said channel regions and said substrate region and to once discharge the information charges in said channel regions.

11. The solid-state image pickup device according to claim 10 wherein said drive circuit sets a start timing of said first period of said second image pickup operation in accordance with the intensity of the light from an object in a period when said picture elements are irradiated with the light.

* * * * *